(12) United States Patent
Smart et al.

(10) Patent No.: US 7,058,140 B2
(45) Date of Patent: Jun. 6, 2006

(54) SLIDING-WINDOW MULTI-CARRIER FREQUENCY DIVISION MULTIPLEXING SYSTEM

(76) Inventors: Kevin J. Smart, 1099 Bountiful Blvd., Bountiful, UT (US) 84010; Trenton D. Stoddard, 7820 S. View Point Dr., G106, Sandy, UT (US) 84094; Sachindev Shetty, 11251 S. State St., #D203, Sandy, UT (US) 84070

(*) Notice: Subject to any disclaimer, the term of this patent is extended or adjusted under 35 U.S.C. 154(b) by 747 days.

(21) Appl. No.: 09/883,845

(22) Filed: Jun. 18, 2001

(65) Prior Publication Data

US 2002/0041637 A1 Apr. 11, 2002

Related U.S. Application Data

(60) Provisional application No. 60/211,934, filed on Jun. 16, 2000.

(51) Int. Cl.
*H04J 3/00* (2006.01)
*H04L 27/144* (2006.01)

(52) U.S. Cl. ..................... 375/316; 370/210
(58) Field of Classification Search ............... 375/316, 375/244, 240; 370/210
See application file for complete search history.

(56) References Cited

U.S. PATENT DOCUMENTS

| | | | | |
|---|---|---|---|---|
| 5,073,900 A | * | 12/1991 | Mallinckrodt | 370/320 |
| 5,373,460 A | * | 12/1994 | Marks, II | 708/300 |
| 5,479,447 A | * | 12/1995 | Chow et al. | 375/260 |
| 5,497,398 A | * | 3/1996 | Tzannes et al. | 375/260 |
| 5,557,612 A | * | 9/1996 | Bingham | 370/449 |
| 5,825,325 A | * | 10/1998 | O'Donovan et al. | 342/353 |
| 5,844,949 A | * | 12/1998 | Hershey et al. | 375/346 |
| 5,933,454 A | * | 8/1999 | Cioffi | 375/260 |
| 5,987,077 A | * | 11/1999 | Bolle | 375/343 |
| 6,065,060 A | * | 5/2000 | Liu et al. | 709/233 |
| 6,690,717 B1 | * | 2/2004 | Kim et al. | 375/219 |
| 6,760,347 B1 | * | 7/2004 | Ojard et al. | 370/516 |

FOREIGN PATENT DOCUMENTS

| | | |
|---|---|---|
| EP | 0 967 763 A1 | 12/1999 |
| WO | WO 96-41458 | 12/1996 |
| WO | WO 98/10545 | 3/1998 |

* cited by examiner

*Primary Examiner*—Kevin Burd
*Assistant Examiner*—Juan Alberto Torres
(74) *Attorney, Agent, or Firm*—Knobbe, Martens, Olson & Bear, LLP

(57) ABSTRACT

A sliding-window multi-carrier communication system is described, wherein the carriers are orthogonal in a local sense, but not necessarily in a global sense. In one embodiment, the system allows a reduction of the length of the basis function time as compared to conventional OFDM systems. In some circumstances, the symbol time can be reduced almost to the basis function length even though the delay spread from channel-to-channel is significant. In one embodiment, a discrete Fourier transform DFT is used in the sliding-window receiver. In one embodiment, the DFT produces M outputs (one output for each of M channels) for each time-domain input. In one embodiment, the DFT produces outputs for M channels from N samples, where N is a basis function length. In one embodiment, the sliding-window receiver provides an adjustable basis-function length. In one embodiment, the basis-function length can be separately selected for each channel. In one embodiment, the sliding-window receiver provides independent equalization for each channel by extracting equalization information from a packet header.

29 Claims, 25 Drawing Sheets

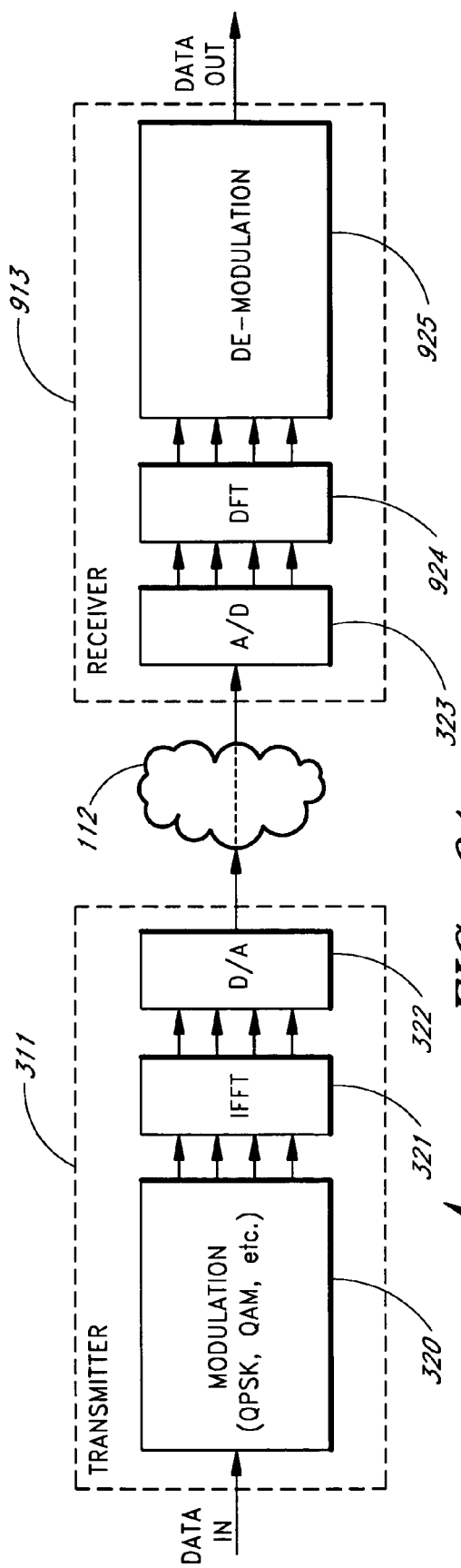
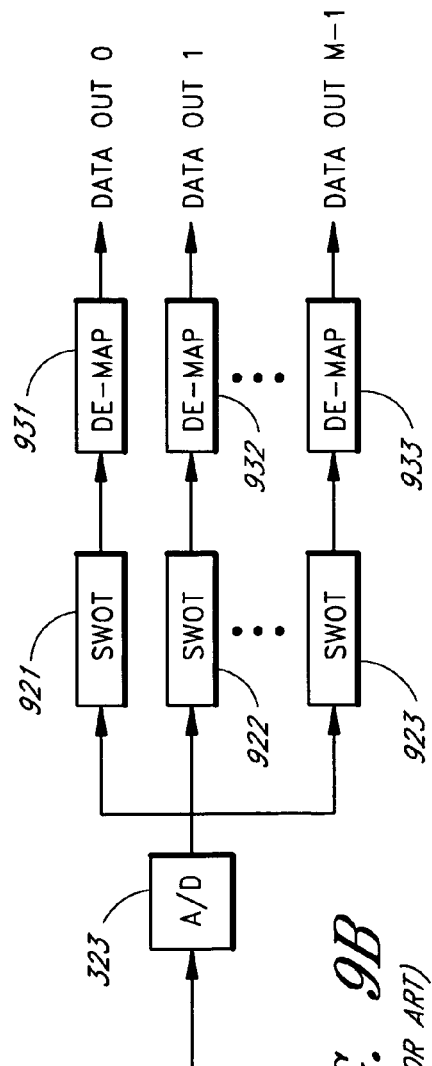
FIG. 9A (PRIOR ART)
FIG. 9B (PRIOR ART)

SLIDING-WINDOW MULTI-CARRIER FREQUENCY DIVISION MULTIPLEXING SYSTEM

REFERENCE TO RELATED APPLICATION

The present application claims priority benefit of U.S. Provisional Application No. 60/211,934, filed Jun. 16, 2000, titled "CONTINUOUS-TIME ORTHOGONAL FREQUENCY DIVISION MULTIPLEXING," the entire contents of which is hereby incorporated by reference.

BACKGROUND OF THE INVENTION

1. Field of the Invention

The invention relates to communication systems that use multiple carriers to improve the bandwidth efficiency of the communication systems, where the carriers are locally orthogonal (but not necessarily globally orthogonal) according to a desired transform.

2. Description of the Related Art

Many communication channels, such as, for example, Radio Frequency (RF) channels, power line channels, and the like, often present a hostile transmission environment for the desired communication signals. These hostile channels can produce a variety of interference mechanisms, including multipath interference, amplitude fading, phase shifts, noise, etc.

In an ideal communication channel, the received signal would consist of only a single direct-path received signal, which would be a perfect reconstruction of the transmitted signal. However in a real channel, the signal is modified during transmission in the channel. The received signal typically comprises a combination of attenuated, reflected, refracted, and diffracted replicas of the transmitted signal. Moreover, the channel typically adds noise to the signal and, in some environments, can cause a shift in the carrier frequency. Understanding these effects on the signal is important because the performance of a communication system is dependent on the channel characteristics.

Attenuation is a drop in the received signal strength. Attenuation can be caused by the transmission path length, obstructions in the signal path, loss in the signal path, and multipath effects. In many systems, especially radio-based systems, the signal from the transmitter may be reflected from discontinuities such as hills, buildings, or vehicles. This gives rise to multiple transmission paths from the transmitter to the receiver. In communication systems that use a guide, such as a waveguide, coaxial cable, fiber-optic cable, twisted pair cable, power line, etc, multipath effects can occur from discontinuities due to impedance mismatches on the cable, connectors, junctions, etc.

As a result, the channel spectral response is typically not flat or uniform. The spectral response has dips or peaks in the response due to loss in the channel and due to reflections from discontinuities. Reflections from near-by discontinuities can lead to multipath signals of similar signal power as the direct signal. This can cause deep nulls in the received signal power due to destructive interference. For narrow-band channels, if the null in the frequency response occurs at the transmission frequency, then the entire signal can be lost. This can be partially overcome in various ways. For example, by transmitting a wide-bandwidth signal (e.g. spread-spectrum), any dips in the spectrum only result in a small loss of signal power. Another method is to split the transmission up into many small bandwidth carriers, as is done in FDM/OFDM systems. The original signal is spread over a wide bandwidth, thus any nulls in the spectrum are unlikely to occur at all of the carrier frequencies. This will result in only some of the carriers being lost, rather than the entire signal. The information in the lost carriers can be recovered by various techniques, including, for example, forward error correction, retransmission on good carriers, etc.

The received signal from a transmitter typically includes a direct signal, plus reflections from various discontinuities in the channel. The reflected signals often arrive at a later time than the direct signal because of the extra path length to the discontinuity, giving rise to a slightly different arrival time of the transmitted pulse, thus spreading the received energy. Delay spread is the time spread between the arrival of the first and last multipath signal seen by the receiver.

In a digital system, the delay spread can lead to inter-symbol interference. This is due to the delayed multipath signal overlapping with the following symbols. This can cause significant errors in high bit rate systems, especially when using time division multiplexing (TDMA). As the transmitted bit rate is increased, the amount of inter-symbol interference typically also increases. The effect usually starts to become very significant when the delay spread is greater than ~50% of the bit time.

For digital communication systems operating at relatively high data rates, that is data rates that approach the Shannon limit for the channel, data bits are often collected into groups and transmitted as symbols. Each received symbol represents one or more bits. One technique often used to improve communication over a hostile channel is to extend of the duration of the symbols by increasing the dimension of the symbol alphabet. In spread-spectrum systems the symbols have a wide spectrum and a narrow auto-correlation function. Unfortunately, the spectral efficiency of this type of system is relatively low and therefore unsuitable for systems where high spectral efficiency is desired.

Another approach for dealing with a hostile channel includes separating the information to be transmitted into a large number of elementary sub-channels, where each sub-channel carries a relatively low bit-rate. This technique, known as Frequency Division Multiplexing (FDM), transforms a highly selective wide-band channel into a large number of non-selective narrow-band channels that are frequency-multiplexed. With FDM there remains the problem of fading. That is, the amplitude of each of the sub-channels follows a Rayleigh law, or a Rice-Nakagami law. The use of a coding system adapted to the fading nature of the channel permits the performance to be considerably improved.

In a conventional (non-orthogonal) FDM system, the many carriers are spaced in such a way that the signals can be received using conventional filters and demodulators. In such receivers, guard bands are introduced between the different carriers. The guard bands represent wasted spectrum and produce a lowering of the spectral efficiency.

In FDMA each user (or each packet in a packet-based system) is typically allocated a single channel, which is used to transmit all the user information. For example, the bandwidth of each channel is typically 10 kHz–30 kHz for voice communications. However, the minimum required bandwidth for speech is only 3 kHz. The allocated bandwidth is made wider than the minimum amount required to prevent channels from interfering with one another. This extra bandwidth is to allow for signals from neighboring channels to be filtered out, and to allow for any drift in the center frequency of the transmitter or receiver. In a typical system up to 50% of the total spectrum is wasted due to the extra spacing between channels. This problem becomes worse as the channel bandwidth becomes narrower and the frequency band increases.

Orthogonal Frequency Division Multiplexing (OFDM) is a special form of FDM wherein the various carriers are made orthogonal to each other. Orthogonal carriers do not interfere with each other, and thus the carriers can be closely spaced. OFDM is similar to FDM in that the multiple user access is achieved by subdividing the available bandwidth into multiple channels that are then allocated to users (or packets). However, OFDM uses the spectrum much more efficiently by spacing the channels much closer together.

Coded Orthogonal Frequency Division Multiplexing (COFDM) is the same as OFDM except that forward error correction is applied to the signal before transmission. This is to overcome errors in the transmission due to lost carriers from frequency selective fading, channel noise and other propagation effects. For this discussion the terms OFDM and COFDM are used interchangeably since forward error correction bits can be added to the data in an OFDM system.

With OFDM, the maximum signaling rate for the given channel (Nyquist rate) can be approached without the use of sharp cutoff filters, thereby facilitating high-speed data transmission. The OFDM system is less sensitive to interference from wide-band impulse noise than time division multiplexing (TDM) systems.

Conceptually, in an FDM system, the carriers are generated by a bank of sinusoidal generators, and then modulated by a bank of modulators. The sinusoidal carriers are more generally referred to as basis functions.

The received carriers are demodulated by a bank of demodulators. For a large number of sub-channels, the arrays of sinusoidal generators, modulators, and demodulators can become unreasonably expensive and complex. Fortunately, an OFDM data signal is effectively the Fourier transform of the original data train, and the bank of coherent demodulators is effectively an inverse Fourier transform generator. A digital OFDM modem can be built around a computer performing Fourier transforms and inverse Fourier transforms.

The orthogonality of the carriers means that each carrier has an integer number of cycles over a basis function period. The spectrum of each carrier has a null at the center frequency of each of the other carriers in the system. Orthogonality also means there is no interference between the carriers, allowing the carriers to be spaced more closely than in FDM systems. This largely overcomes the spectral inefficiencies found in non-orthogonal FDMA systems.

Each channel in an OFDM signal has a relatively narrow bandwidth, thus the resulting symbol rate on each channel is lower than the symbol rate that could be obtained using TDMA on the same medium. This results in the signal having a high tolerance to multipath delay spread, as the delay spread must be very long to cause significant inter-symbol interference. Also an OFDM system is spectrally much more efficient than the traditional FDMA type system where no spectral overlap is allowed.

To generate OFDM, the relationship between the carriers is controlled to maintain the orthogonality of the carriers. Each carrier to be produced is assigned some data to transmit. The required amplitude and phase of each carrier is then calculated based on the desired modulation scheme (e.g., differential BPSK, QPSK, QAM, etc.). The required spectrum is then converted back to its equivalent time-domain signal using an Inverse Fourier Transform. In most applications, an Inverse Fast Fourier Transform (IFFT) is used. The IFFT performs the transformation very efficiently, and provides a simple way of ensuring the carrier signals are orthogonal.

The Fast Fourier Transform (FFT) transforms a cyclic time domain signal into its equivalent frequency spectrum. This is done by finding the equivalent waveform, generated by a sum of orthogonal sinusoidal components. The amplitude and phase of the sinusoidal components represent the frequency spectrum of the time domain signal. The IFFT performs the reverse process, transforming a spectrum (amplitude and phase of each component) into a time domain signal. An IFFT converts a number of complex data points into the time domain signal of the same number of points. Each data point in the frequency spectrum used for an FFT or IFFT is called a bin.

The orthogonal carriers for the OFDM signal can be generated by setting the amplitude and phase of each bin, then performing the IFFT. Since each bin of an IFFT corresponds to the amplitude and phase of a set of orthogonal sinusoids, the FFT, being the reverse process, guarantees that the carriers are orthogonal.

One of the advantages of OFDM transmissions is robustness against multipath delay spread. This is achieved by having a long symbol period, which reduces the inter-symbol interference. The level of robustness can be increased even more by the addition of a guard period between transmitted symbols. The guard period allows time for multipath signals from the previous symbol to die away before the information from the current symbol is gathered. One type of guard period is a cyclic extension of the symbol. Using a mirror in time of the end of the symbol waveform, and placing this mirror image at the start of the symbol, effectively extends the length of the symbol while maintaining the orthogonality of the waveform. Using this cyclic extended symbol, the samples required for performing the FFT (to decode the symbol) can be taken anywhere over the length of the symbol. This provides multipath immunity as well as symbol time synchronization tolerance.

As long as the multipath delay echoes stay within the guard period duration, there is, strictly speaking, no limitation regarding the signal level of the echoes. The echoes can even exceed the signal level of the direct path. The signal energy from all paths just add at the input to the receiver, and since the FFT is energy conservative, the whole available power feeds the decoder. If the delay spread is longer than the guard interval, then they begin to cause inter-symbol interference. Fortunately, longer delay spreads usually correspond to reflections from distant discontinuities, and these reflections tend to arrive at the receiver with a relatively small amplitude (thus causing relatively little interference). Inter-symbol interference occurs when spectrum of a symbol on one sub-channel interferes with the spectrum of a subsequent or prior symbol on the same sub-channel. Inter-carrier interference occurs when the spectrum of a symbol on one channel interferes with the spectrum of a symbol on a different channel Unfortunately, the need for a guard period reduces the symbol rate that can be transmitted on the channel. A reduced symbol rate corresponds to a reduced data rate. Thus, it is desirable to reduce the length of the guard period. The length of the guard period is driven by two factors. First, the guard period must be long enough to reduce inter-symbol interference on each channel. Second, the guard period must be long enough to cover all channel-to-channel delay spreads. To understand this second requirement, it is observed that the FFT and IFFT operations used in conventional OFDM systems are block operations that are applied to all channels simultaneously. Thus, in a conventional OFDM system, the guard period must be long enough to provide enough delay spread across all channels, even though there is typically no inter-channel multipath effects. This means that the guard period on a conventional OFDM system can significantly reduce the overall system data rate. The length of the guard band is adversely affected by the delay spread across the channels, because the guard band must be long enough to deal with a worst-case delay-spread across all of the channels. In some environments, especially where the channel-to-channel delay spread is very large, the length of the guard band can become prohibitively long and can significantly reduce throughput.

SUMMARY OF THE INVENTION

The present invention solves these and other problems by providing a multi-channel receiver that uses sliding-window processing of received signals to provide improved performance over block-based OFDM systems. The received signals are processed according to a transform that is based on a sliding window. In one embodiment, the sliding window transform uses a set of basis functions. The width of the sliding window is typically relatively shorter than the symbol time, however, the width of the sliding window can be the same as the symbol time even though the delay spread from sub-channel-to-sub-channel is significant. In one embodiment, the basis function length is not significantly shorter than the symbol time even in the face of large channel-to-channel delay spreads. The sliding-window system provides relatively more local orthogonality (that is, orthogonality between adjacent or nearby sub-carriers) and relatively less global orthogonality (that is, orthogonality between all sub-carriers) than a conventional block-based OFDM receiver.

In one embodiment, one or more of the basis functions are orthogonal. In one embodiment, the basis functions are not orthogonal. In one embodiment, the basis functions are non-sinusoidal basis functions as commonly seen in wavelets where the basis functions are generated from a mother wavelet, which is not necessarily sinusoidal in character.

In one embodiment, the sliding-window transform is derived from the discrete Fourier transform (DFT). In one embodiment, the DFT produces M outputs (one output for each of M sub-channels) for the received time domain inputs. In one embodiment, the DFT produces outputs for M sub-channels from N samples, where N is the basis function length. In one embodiment, the sliding-window receiver provides an adjustable basis-function length. In one embodiment, the basis-function length can be separately selected for each sub-channel.

In one embodiment, the continuously processed receiver allows for different inter-symbol times over different sub-bands of the communication channel. The value of the symbol time can be controlled adaptively depending on the delay spread of the time-variant nature of the communication channel. In one embodiment, this is achieved by processing data at the receiver in a continuous manner, and partitioning the transmission bandwidth of the communication channel into different sub-bands, each sub-band containing a plurality of carriers that are orthogonal within that sub-band. The continuous processing of the system also allows for variable symbol times on the same carrier frequency. Therefore, for frequencies experiencing channel fading and other types of narrowband interference, the symbol time can be made long enough so that the relative effects of the interference gets reduced, while for other frequencies, a relatively shorter symbol time is used.

This sliding-window system provides more emphasis on local orthogonality of the sub-carriers (i.e. carriers spaced in a certain sub-band of the frequency spectrum) and less on global orthogonality (i.e. carriers across the entire frequency spectrum of the transmission channel). The effects of non-orthogonal carriers are mitigated by sub-band filtering. In one embodiment, relatively higher performance is provided in some carriers where the symbol length is reduced. By contrast, a block-based OFDM system typically provides relatively lower performance because the guard time (which is part of the symbol time) needs to account for the maximum delay spread across all the sub-channels and hence increases the symbol time.

In one embodiment, the continuous nature of the receiver is used to provide independent synchronization and equalization for each channel by extracting equalization information from a packet header. The packet header can be the same for all channels, or the packet header can be specific to a particular channel. In one embodiment, differential detection of the continuously processed data is used to help determine the communication channel properties.

In one embodiment, the basis functions are sinusoidal in nature and generated by a Quarter-wave Sine Look up Table (QSLUT). In one embodiment the synthesis of the basis function is provided by using a CORDIC (and a modified ) algorithm. When implemented in hardware, the CORDIC architecture provides efficient use of on-chip resources such as power and Read Only Memory (ROM) space.

In one embodiment, the basis functions are complex sinusoids, which can be generated by a Discrete Fourier Transform (DFT). In one embodiment, the complex sinusoids are generated by using a Fast Fourier Transform. In one embodiment, the complex sinusoids are generated by using the QSLUT. Since the Discrete Fourier transform can be efficiently implemented using phase rotations rather than complex multiplications it can therefore be efficiently implemented using the CORDIC algorithm. In one embodiment, the CORDIC implementation of the DFT is used with fixed-point arithmetic.

In one embodiment, the basis functions are discrete orthogonal wavelets. In one embodiment, the discrete orthogonal wavelets are generated by an M-band wavelet filter, which can be efficiently implemented by the Fast Wavelet transform (FWT). Wavelets provide logarithmic frequency localization with a relatively finer time localization at higher frequencies.

In one embodiment the basis function length is adjustable on a particular sub-band and is not required to be the same length on a different sub-band or symbol generated at a later time.

In one embodiment, a first sliding window DFT transform (referred to herein as a Type-1 transform) is used in the receiver. The Type-1 transform produces M different outputs corresponding to the different sub-channels on any particular sub-band for every time-domain sample. The number of outputs, M, can be different on different sub-bands. The length of the sliding window Fourier transform window is adjustable and is based on the desired frequency spacing between the sub-carriers in the same sub-band. In one embodiment the sliding window discrete Fourier Transform is implemented using the CORDIC algorithm.

In another embodiment a second sliding window modified DFT (referred to herein as a Type-2 transform) is used. As with the Type-1 embodiment, the Type-2 transform produces M different outputs corresponding to the different channels.

Similarly the window length and the number of outputs can be varied. The Type-2 embodiment is similar to the Type-1 embodiment (to within a complex time dependent correction factor), but typically has a relatively more stable feedback loop and typically requires relatively less bit resolution in the numeric processing elements (e.g., multipliers) In one embodiment, the sliding window modified discrete Fourier transform is also implemented using the CORDIC algorithm.

In one embodiment, the continuous processing receiver provides equalization and synchronization on a per-channel basis by extracting information from a packet header.

In one embodiment the received signal is passed through one or more sub-band filters that separate the received signal into different frequency sub-bands. Separating the received signal into sub-bands tends to reduce the peak-to-average power ratio (PAR) for the different sub-bands and tends to reduce the complexity of the analog-digital converters.

In one embodiment the PAR is reduced by using spreading codes that produce symbols for which the PAR is lowered. In one embodiment, the codes are derived from the classical Rudin-Shapiro polynomials and have a crest factor (defined as the maximum signal value divided by the RMS signal value) less than $\sqrt{2}$.

In one embodiment, the sliding-window system is used to transmit and receive data on a power line network. In one embodiment, the sliding-window system is used to transmit and receive data on a radio transmission network. In one embodiment, the sliding-window system provides an adjustable basis-function length.

In one embodiment, the sliding-window system is used to transmit and receive data on a vehicle, such as, for example, an aircraft, ship, land-based vehicle, etc. In one embodiment, the sliding-window system is used to transmit and receive data on existing wiring in a vehicle, such as, for example, passenger-cabin lighting circuits in a commercial aircraft.

BRIEF DESCRIPTION OF THE DRAWINGS

These and other features of the invention will now be described with reference to the following drawings.

FIG. 9A is a block diagram of a sliding-window transform-based system.

FIG. 9B is a block diagram of a multi-channel sliding-window transform-based system.

Figure 1:
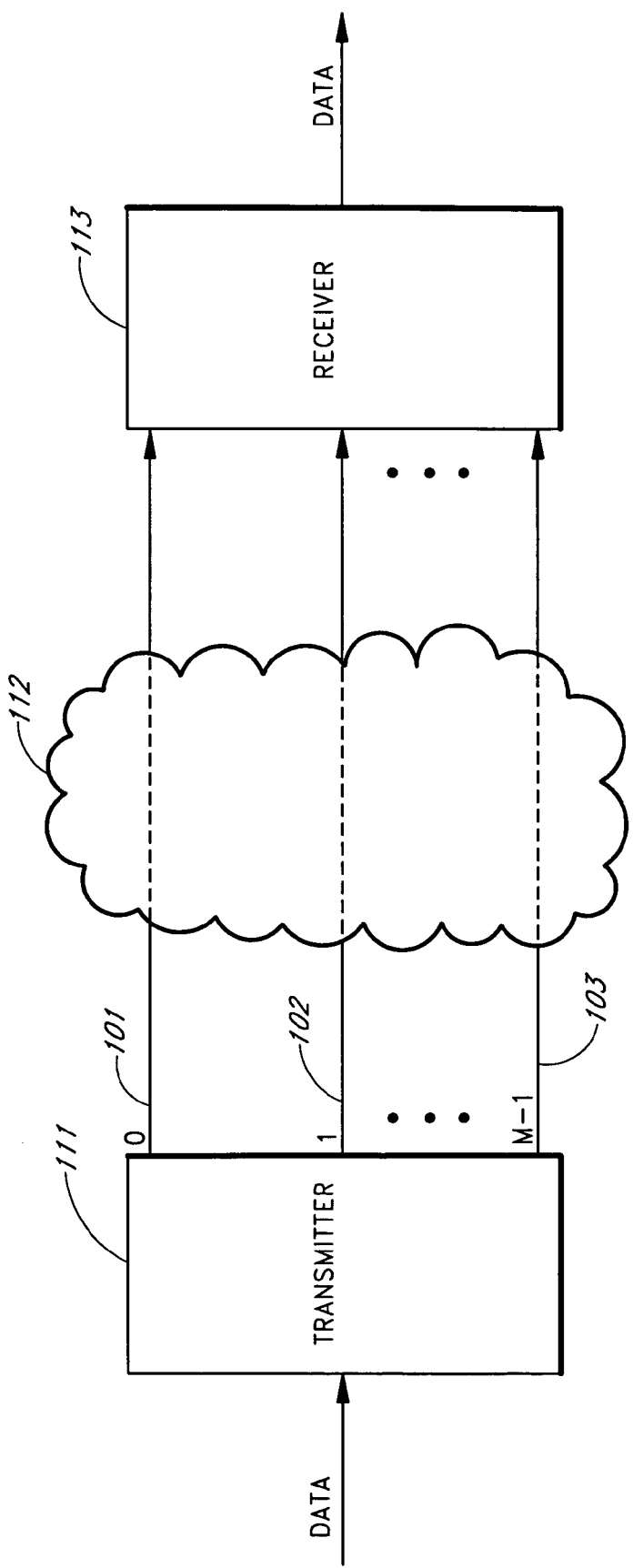
FIG. 1 is a block diagram of a multi-channel communication system.

In the drawings, like reference numbers are used to indicate like or functionally similar elements. The first digit of each three-digit reference number generally indicates the figure number in which the referenced item first appears. The first two digits of each four-digit reference number generally indicate the figure number in which the referenced item first appears.

DETAILED DESCRIPTION

For the sake of clarity in the following disclosure, a distinction is made between sub-carriers and sub-channels when dealing with sinusoidal basis functions. Generally, a sub-channel is a frequency bandwidth allocated for the transfer of the modulated signals. The carrier frequency is usually the carrier frequency of the sinusoidal signal used to modulate a baseband signal into the bandwidth of the sub-channel. The sub-carrier is the sinusoidal signal.

FIG. 1 is a block diagram showing a multi-channel medium 112 connecting a multi-channel transmitter 111 to a multi-channel receiver 113. The multi-channel medium 112 is configured to provide m separate data channels 101–103 shown as a first channel 101, a second channel 102, and an M-th channel 103. The multi-channel transmitter 111 provides a separate data output to each channel 101–103 and each of the multi-channels 101–103 is provided to a separate data input of the multi-channel receiver 113. In one embodiment, the multi-channel transmitter 111 receives a single logical input data stream and separates the input data stream into M data streams, one stream for each of the M channels. Similarly, the multi-channel receiver 113 receives the data from the multi-channel transmitter 111 on M data streams and combines the received data into a single logical output stream. In one embodiment, the multi-channel transmitter 111 receives multiple data streams and the receiver 113 outputs multiple data streams. The multi-channel medium 112 can be, for example, a wire, a cable, an optical fiber, a coaxial cable, a waveguide, a radio-frequency propagation path, an optical propagation path, a twisted pair cable, etc.

The multi-channel medium 112 can be separated into separate channels by using Time Division Multiplexing (TDM, also referred to as TDMA or Time Division Multiple Access), by Frequency Division Multiplexing (FDM, also referred to as Frequency Division Multiple Access or FDMA), by Code Division Multiplexing (CDM, also known Code Division Multiple Access or CDMA), and by combinations of TDM, FDM, and CDM). FIG. 1 shows the separate FDM channels as separate entities. Thus, FIG. 1 is, conceptually, a frequency-domain representation of the transmitter-to-receiver communication process. One skilled in the art will understand that in practice, the medium 112 is typically a single physical connection (such as a wire, fiber, RF radiation path, etc.) and the separate channels 0 through (M−1) are all transmitted over the same physical connection.

Figure 2:
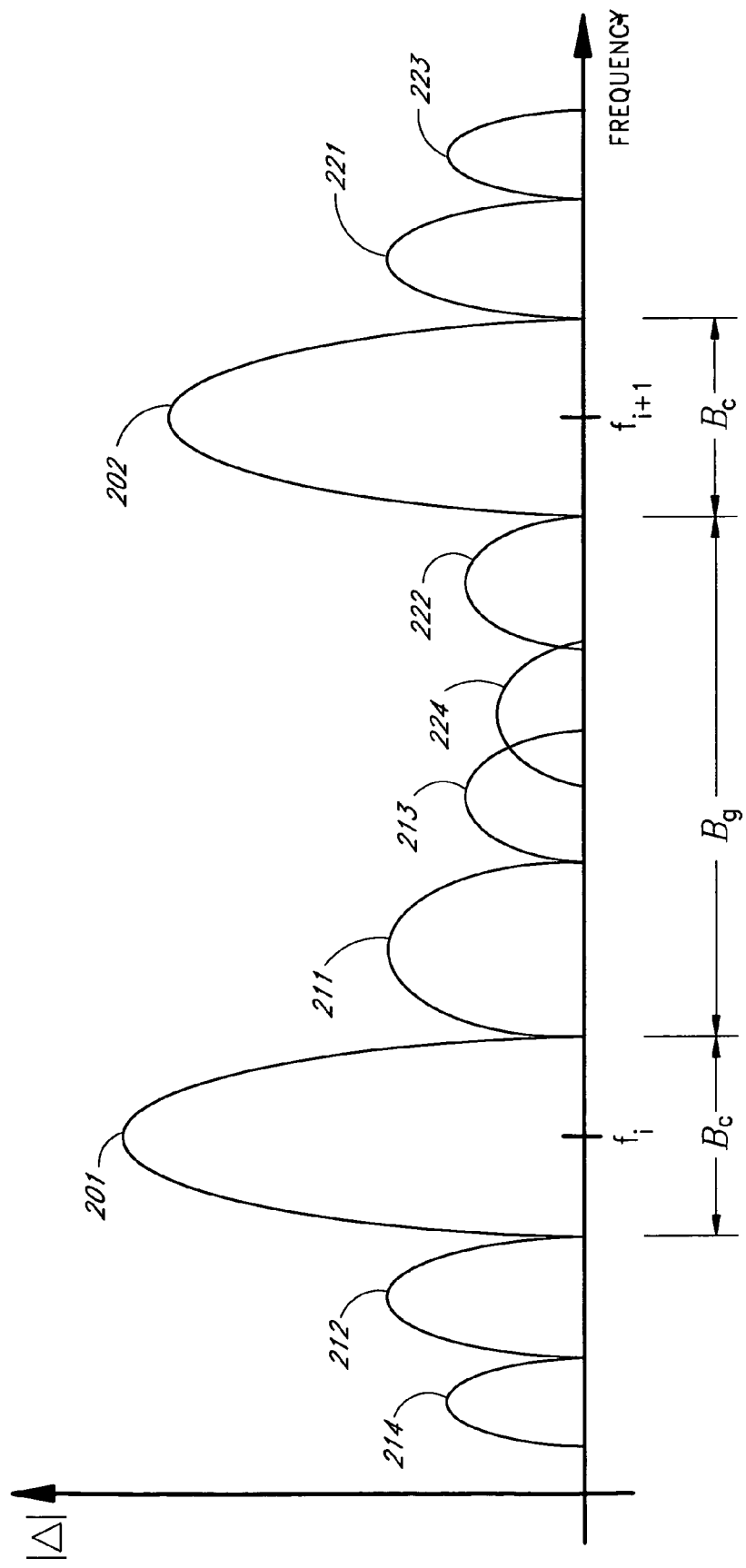
FIG. 2 shows a frequency spectrum of a conventional non-orthogonal FDM system.

FIG. 2 shows a frequency spectrum of a conventional FDM system having a first channel corresponding to a carrier frequency $f_i$ and a second channel corresponding to a carrier frequency $f_{i+1}$. The modulated spectrum of the first channel (being the spectrum obtained by modulation of the carrier $f_i$), includes a first channel main lobe 201, first upper and lower sidelobes 211 and 212 respectively, and second upper and lower sidelobes 213 and 214 respectively. The modulated spectrum of the second channel (being the spectrum obtained by modulation of the carrier $f_{i+1}$), includes a second channel main lobe 202, first upper and lower sidelobes 221 and 222 respectively, and second upper and lower sidelobes 223 and 224 respectively.

Typically, the first sidelobes are significantly lower in amplitude than the main lobes, and the second sidelobes are lower in amplitude than the first sidelobes. One skilled in the art will recognize that in most situations, many more sidelobes are present and the amplitude of the higher-order sidelobes decreases more or less monotonically Unfortunately, the upper sidelobes of the first channel (e.g., the sidelobes 211 and 213) overlap the lower sidelobes of the second channel (e.g., the sidelobes 224 and 222). This overlap means that there is some interference between the first channel and the second channel. In general, this interference cannot be removed by conventional bandpass filtering. However, since the overlapping sidelobes are relatively small in amplitude as compared to main lobes (decay as sin $c^2(x)$ type functions), the sidelobe-generated interference is usually acceptably small.

In FIG. 2, the bandwidth of the two main lobes 201 and 202 are each shown as a bandwidth $\beta_c$ centered at the carrier frequencies $f_i$ and $f_{i+1}$. A guard band, having a bandwidth $\beta_g$ is shown between the two regions $\beta_c$. The guard band $\beta_g$ represents unused (lost) spectrum. The guard band $\beta_g$ is used merely to provide enough separation between the two regions $\beta_c$ so that the sidelobes from one sub-carrier do not significantly interfere with the main lobe of the adjacent sub-carrier. In other words, the guard band $\beta_g$ is provided to ensure that the second sub-carrier main lobe 202 falls on top of smaller sidelobes of the first sub-carrier (and vice versa) thus reducing the inter-channel. interference.

Figure 3A:
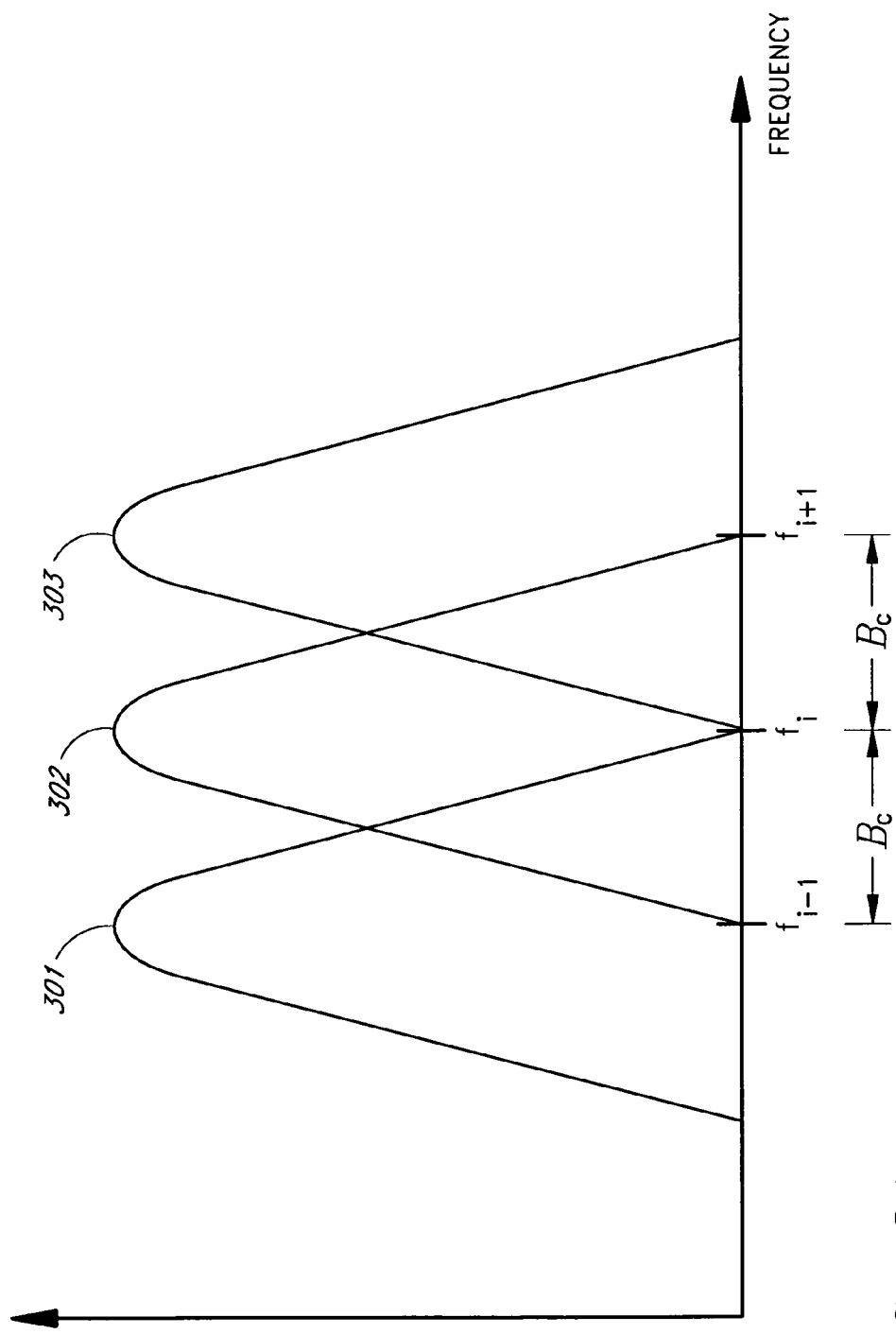
FIG. 3A shows the spectrum of an OFDM system, including a first channel main lobe that overlaps a portion of a second channel main lobe, and a third channel main lobe that overlaps a portion of the second channel main lobe.

In OFDM, the guard band $\beta_g$ is eliminated by generating the spectrum of the sub-carriers in a manner such that the carriers are orthogonal to one another. FIG. 3A shows the spectrum of an OFDM system, including a first sub-carrier main lobe 301, a second sub-carrier main lobe 302, and a third sub-carrier main lobe 303. Each of the main lobes 301–304 typically has a large number of upper and lower sidelobes (not shown). The carrier frequency of the first, second, and third sub-carrier is shown as $f_{i-1}$, $f_i$, and $f_{i+1}$ respectively. The peak of the second sub-carrier main lobe 302 falls at $f_i$, and the first nulls of the second sub-carrier main lobe 302 fall at $f_{i-1}$ and $f_{i+1}$.

Configuring the frequency spectrum as shown in FIG. 3A provides greater use of the available frequency bandwidth. Not only has the guard band $\beta_g$ been removed, but, in fact, the adjacent bands $\beta_c$ overlap. Even though the adjacent sub-carriers overlap in the frequency domain, the carriers can be separated from one another by proper processing. This is accomplished by generating the modulated carrier for each channel (i.e., the basis functions) such that the sub-carriers are orthogonal under some inner product. As discussed above, one technique for accomplishing this orthogonality is to use the properties of the Fourier transform (whose basis functions are orthogonal). Other orthogonal basis functions, such as, for example various wavelet functions or weighted Fourier basis can also be used to develop orthogonal basis functions (sub-carriers).

Figure 3B:
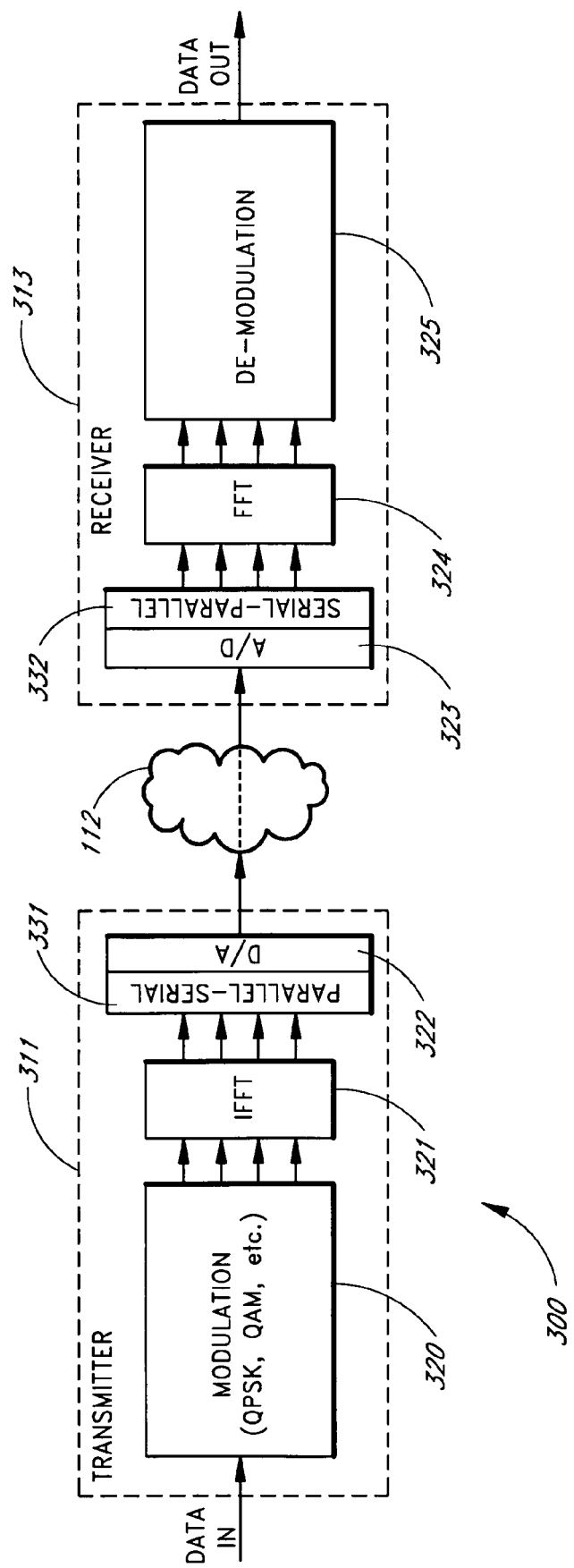
FIG. 3B is a block diagram of an FFT-based OFDM system.

FIG. 3B shows a Fourier Transform based OFDM system that includes a transmitter 311 and a receiver 313. The transmitter 311 includes a modulator 320, an IFFT 321, a parallel-to-serial converter 331 and a D/A (Digital to Analog converter) 322. The receiver 312 includes an A/D (Analog to Digital converter) 323, a serial-to-parallel converter 332, an FFT 324, a demodulator 325. Input data is provided to an input of the modulator 320. The modulator 320 assigns data bits (symbols) to each of the carriers, and modulates the carriers accordingly. The carriers are provided to the IFFT 321. The IFFT 321 converts the carriers (frequency domain) into samples (time domain). The time domain samples are serialized by the parallel-to-serial converter 331 and provided to the D/A 322. The analog output of the D/A is provided, via the medium 112, to the A/D 323. The A/D 323 converts the analog samples into digital samples. The digital samples are converted from serial to parallel streams by the serial-to-parallel converter 332 and provided to the FFT 324. The FFT 324 converts the digital samples (time domain) back into modulated carriers. The modulated carriers are provided to the demodulator 325. The demodulator 325 demodulates the carriers to extract the output data. One skilled in the art will recognize that other conventional operations, such as framing, blocking, and error correction can also be provided.

As shown in FIG. 3B, in an OFDM system, the relationship between the sub-carriers is controlled to maintain the orthogonality of the carriers. Each carrier to be produced is assigned some data to transmit by the modulator 320. Typically, each carrier is modulated according to symbols, where each symbol represents a plurality of digital bits. The required amplitude and phase of the sub-carrier is then calculated based on the modulation scheme (differential BPSK, QPSK, QAM, etc.) and the symbol selected for that carrier. The required spectrum is then converted back to a time-domain signal using an IFFT 321. The IFFT 321 performs the transformation very efficiently, and provides a simple way to make the carrier signals mutually orthogonal. The IFFT 321 transforms a spectrum (amplitude and phase of each component) into a time-domain signal. The IFFT 321 converts a number of complex data values into time samples. Each data point in frequency spectrum used for an FFT or IFFT is called a bin. The orthogonal carriers required for the OFDM signal can be easily generated by setting the amplitude and phase of each bin, then performing the IFFT 321.

The FFT 324 transforms a cyclic time domain signal into its equivalent frequency spectrum. This is done by finding the equivalent waveform, generated by a sum of orthogonal sinusoidal components. The amplitude and phase of the sinusoidal components represent the frequency spectrum of the time domain signal. Since each bin of the IFFT 321 corresponds to the amplitude and phase of a set of orthogonal sinusoids, the reverse process (the FFT 324) guarantees, at least in a mathematical sens e, that the carriers generated are orthogonal and there is (at least theoretically) no inter-channel interference. In practice some inter-channel interference does occur due to real-world effects, such as, for example, clock differences between the transmitter clock and the receiver clock, non-linearities in the channel and the electronic devices used in the transmitter and receiver, etc.

While the OFDM process of generating orthogonal carriers using the IFFT and FFT significantly reduces inter-channel interference, it does nothing to reduce inter-symbol interference. Inter-symbol interference, that is, interference between one symbol and the next symbol on the same channel, is typically provided by spacing the symbols far enough apart in time (that is, by reducing the effective symbol rate) such that the multipath effects, and other time-dependent effects created by one symbol, have died out before the next symbol is transmitted. Thus, the OFDM system 300 uses elements of both FDM and TDM. The symbols are separated by frequency across the channels (FDM) and by time within the channel (TDM).

Figure 4:
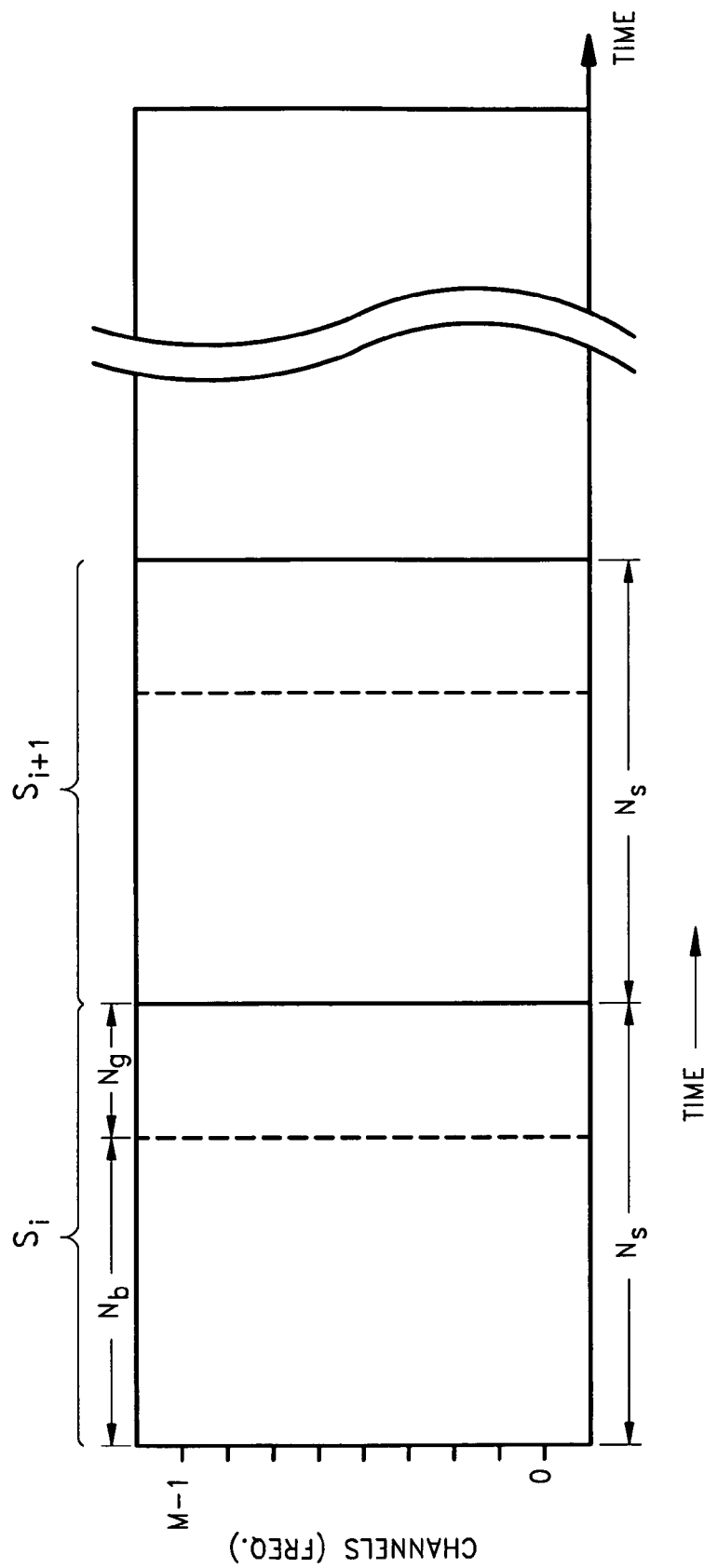
FIG. 4 illustrates the introduction of a guard period to reduce inter-symbol interference in a channel.

Inter-symbol interference is reduced by introducing a guard period as shown in FIG. 4. FIG. 4 shows transmission of a first group of symbols (the group $S_i$) and a second group of symbols $S_{i+1}$. Each group represents M symbols transmitted across M channels, one symbol per channel in each group. The symbols each have a basis-function time $N_b$ (corresponding to the number of time-domain samples produced by the IFFT 321) and a guard period time $N_g$. The total symbol time $N_s$ is the sum of $N_b$ and $N_g$. The guard period allows time for multipath signals within each channel from the previous symbol to die away before the information from the current symbol is gathered. One of the more effective types of guard period to use is a cyclic extension of the symbol. Placing a replication of a portion of the end of the symbol waveform at the start of the symbol effectively extends the length of the symbol, while maintaining the channel-to-channel orthogonality of the waveform. Using this cyclic extended symbol, the $N_b$ samples required for performing the FFT 324 (to decode the symbol) can be taken anywhere over the length of the symbol (that is, anywhere within the set of samples $N_s$). This provides multipath immunity as well as symbol time synchronization tolerance.

As long as the time duration of multipath delay echoes stay within the guard period duration, there is, strictly speaking, no limitation regarding the signal level of the echoes, they may even exceed the signal level of the direct path. The signal energy from all paths is added together at the input to the receiver, and since the FFT is energy conservative, the whole available power feeds the demodulator 325. If the delay spread is longer than the guard interval then inter-symbol interference will occur. Fortunately, longer delay spreads usually correspond to reflections from distant discontinuities, and these reflections tend to arrive at the receiver 313 with a relatively small amplitude (thus causing relatively little interference).

Unfortunately, the need for a guard period reduces the symbol rate that can be transmitted on the channel. Thus, it is desirable to reduce the length of the guard period. The length of the guard period is driven by two factors. First, the guard period must be long enough to reduce inter-symbol interference on each channel. Second, the guard period must be long enough to cover all channel-to-channel delay spreads. To understand this second requirement, it is observed that the IFFT 321 and FFT 324 processes shown in FIG. 3B each operate on a block of data across all channels. The IFFT is performed once per symbol (simultaneously across all channels) to transmit the symbol group $S_i$, and the FFT is also performed once per symbol (again, simultaneously across all channels) to receive the symbol group $S_i$. This is block-type (or batch mode) form of processing across all channels at one time and is inefficient when there is significant channel-to-channel delay spread.

Figure 5:
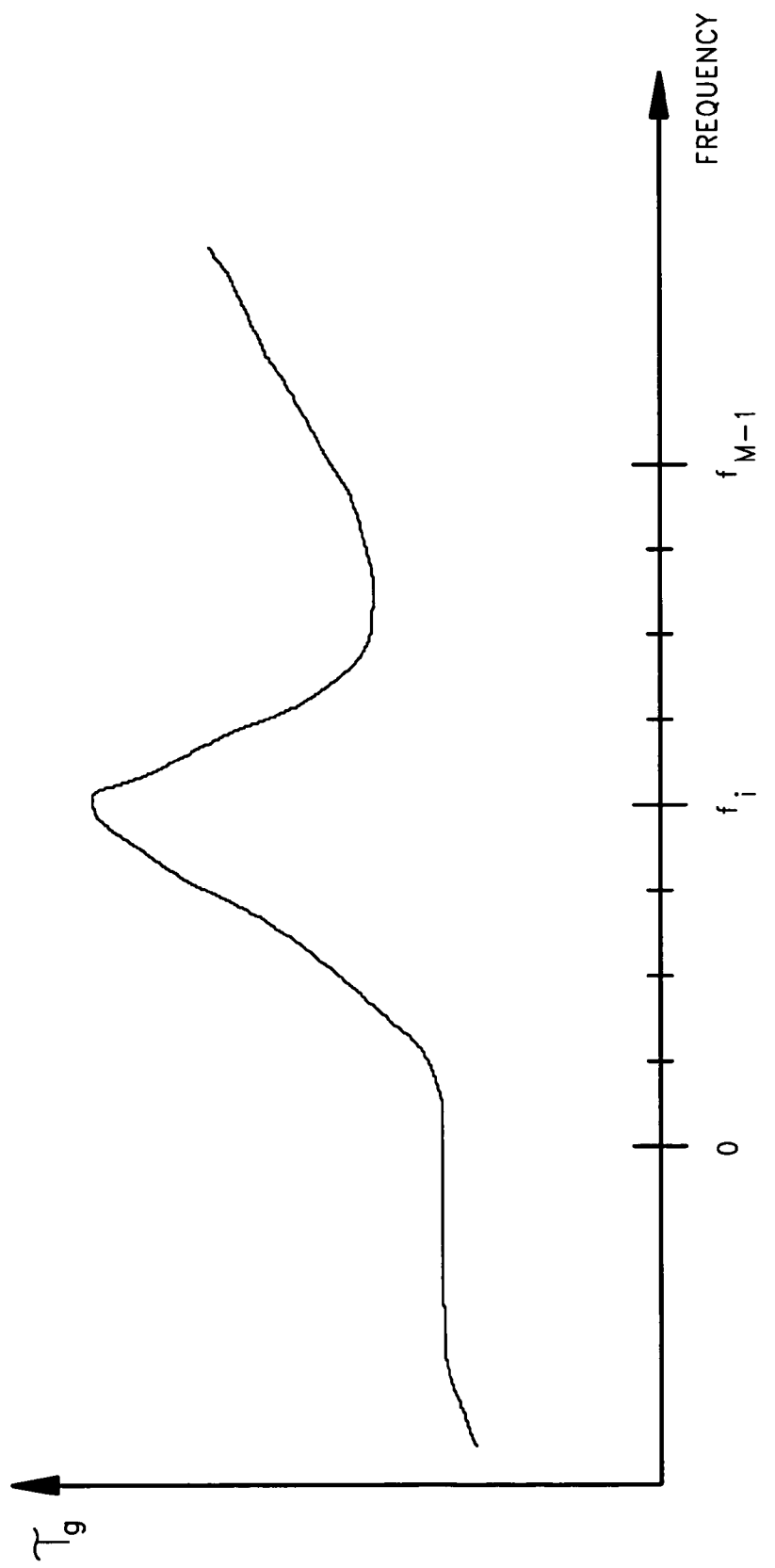
FIG. 5 shows an example the group delay $\tau_g$ across M channels, corresponding to M carriers at frequencies $f_0$ through $f_{M-1}$.

FIG. 5 shows an example the group delay $\tau_g$ across M channels, corresponding to M carriers at frequencies $f_0$ through $f_{M-1}$. As shown in FIG. 5, some channels will have a much longer group delay than other channels. Moreover, the curve shown in FIG. 5 is usually unpredictable, and changes with time.

Figure 6:
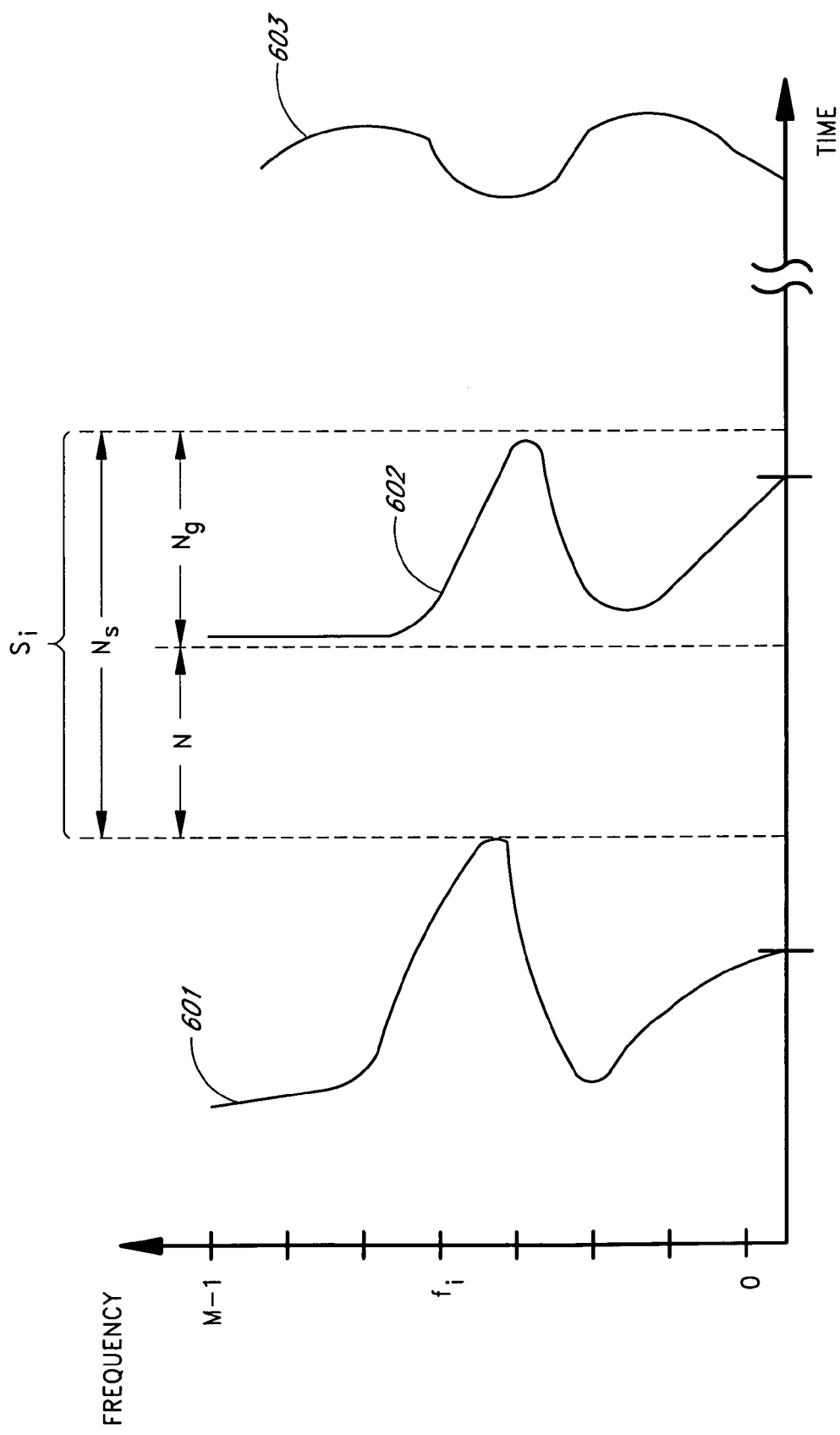
FIG. 6 is a time-frequency diagram showing a time-history of the group delay curve for M channels in an FDM system.

FIG. 6 shows an example of a time-history of the group delay curve for M channels. FIG. 6, shows a first group delay curve 601 and a second group delay curve 602. The curve 602 follows the curve 601 by one symbol time period. Since the symbol time is relatively short, it is reasonable to expect that the curves 601 and 602 will be similar. In other words, it is reasonable to expect that the group delay characteristics of each channel will typically not change substantially during a single symbol period. However, at an arbitrary later time, the group delay characteristics of each channel may be distinctly different, as illustrated by a curve 603.

Figure 7:
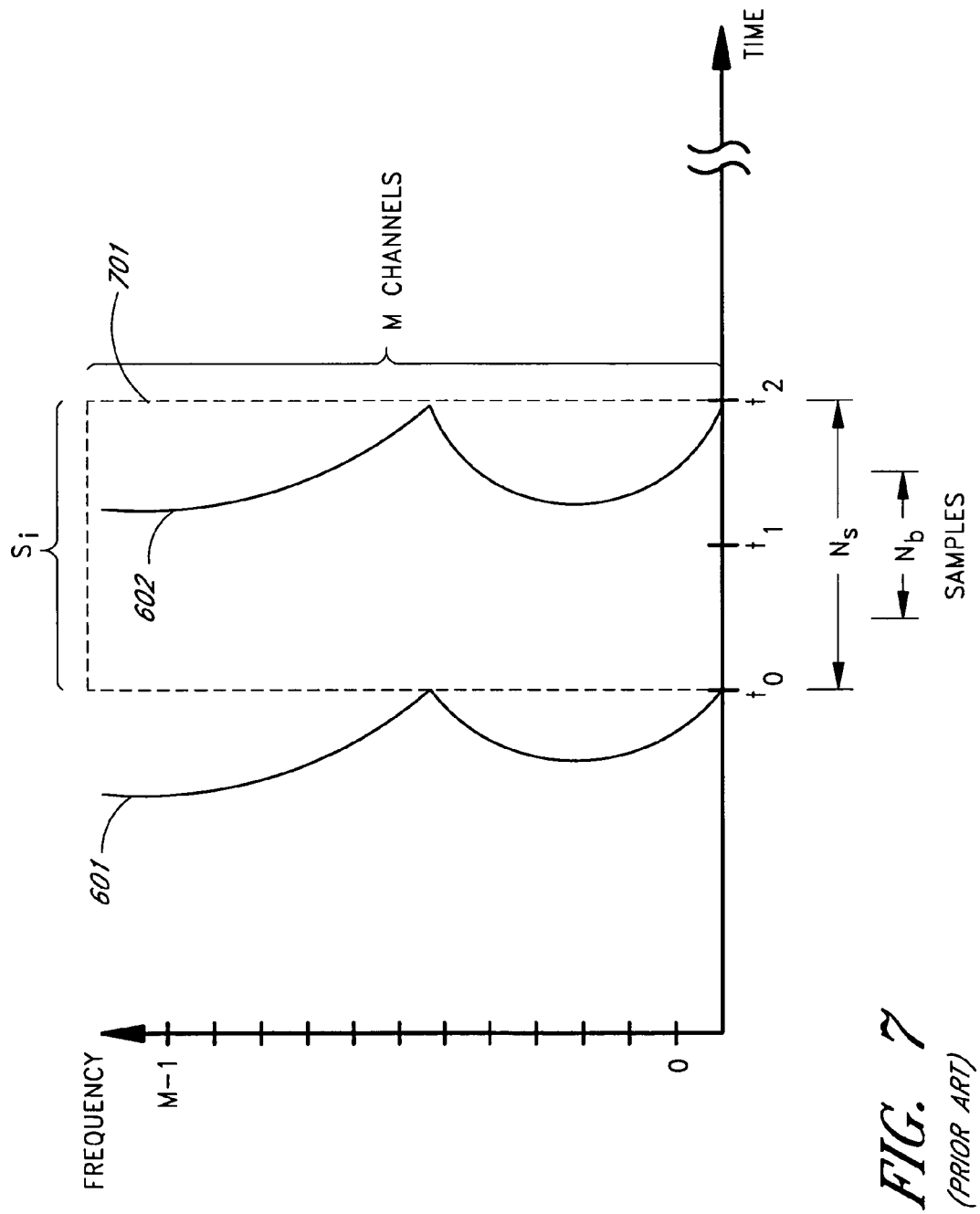
FIG. 7 is a time-frequency diagram of an OFDM system illustrating how in the block-processing nature of the FFT operation the symbol length is dictated by the maximum delay spread.

The block processing nature of the IFFT 321 and the FFT 324 means that the multipath effects of all channels must die out before the next symbol can be transmitted on any channel. Thus, as shown in FIG. 6, the guard time $N_g$ must be extended to include the group delay effects of the channel showing the longest group delay. This is also illustrated in FIG. 7, where it is shown that the IFFT 321 and the FFT 324 within a time-frequency block 701. A frequency axis of the block 701 corresponds to the M frequency bins corresponding to the M channels. A time axis of the block 701 corresponds to the $N_s$ samples of a symbol time. Of the $N_s$ samples, $N_b$ samples are used in the FFT block 324 (where $N_b$=M).

By operating in the block 701, the FFT 324 assures global orthogonality among all of the sub-carriers 0 through M−1. Thus for example, the FFT 324 assures that the first channel with sub-carrier operating a at a frequency $f_0$ is orthogonal to (i.e. does not interfere with) the (M−1)th channel with sub-carrier operating at a frequency $f_{M-1}$. The penalty for global orthogonality is that the guard period must be long enough to deal with the variation in delay spreads among all channels and is therefore dictated by the maximum delay spread. Fortunately, global orthogonality is not necessary. As shown in FIG. 2, the sidelobes of a carrier are attenuated at frequencies removed from the carrier frequency. Thus, in many circumstances, the sub-carrier operating at frequency $f_0$ and the sub-carrier operating at frequency $f_{M-1}$ do not need to be orthogonal, because the main sidelobes of the carrier $f_0$ do not interfere with the main lobe of the carrier $f_{M-1}$ and vice versa. In many circumstances, only adjacent carriers, or nearby carriers need to be orthogonal to avoid any noticeable inter-channel interference.

Figure 8:
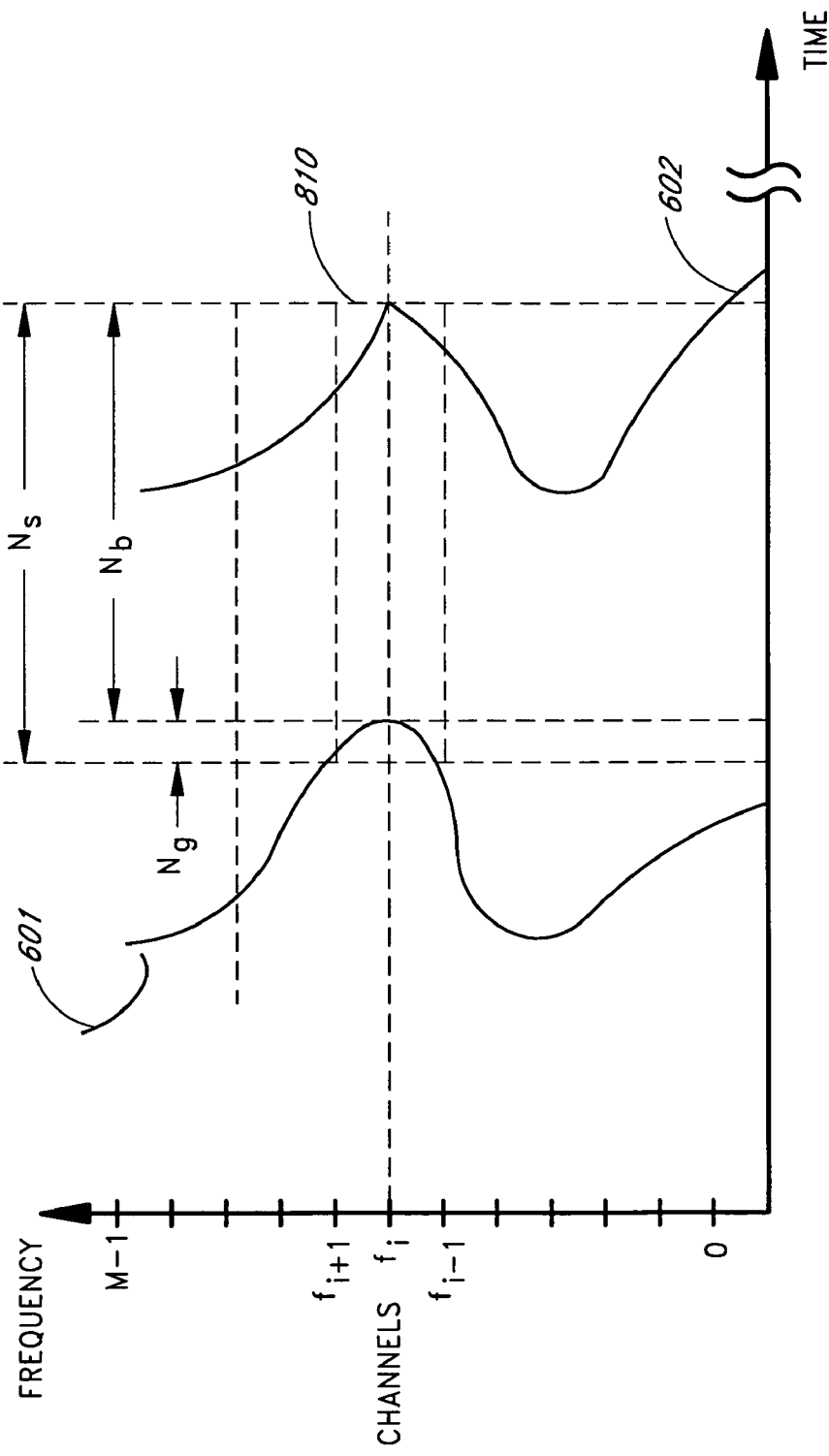
FIG. 8 is a time-frequency diagram of the symbol time in a sliding-window transform-based system where the symbol length over the entire system could be dictated by the mean delay spread.

As shown graphically in FIG. 8, by using sliding-window processing, global orthogonality can be sacrificed in order to reduce the length of the symbol time $N_s$. FIG. 8 shows the curves 601–602, and the basis function time $N_b$ as before. The basis function time $N_b$ cannot be reduced because $N_b$=M. However, the symbol time $N_s$ can be reduced as shown in FIG. 8. In FIG. 8, the symbol time $N_s$ is reduced to a value only somewhat larger than the basis function time $N_b$. The extra length of the symbol time is long enough to account for the variation in the group delay among adjacent channels. Thus, the difference between the symbol time $N_s$ and the basis function time $N_b$ becomes dependent more on the sidelobe structure of the carriers and the slope of the curves 601 and 602 rather than the width of the curves 601 and 602. This is conceptually similar (although, strictly speaking, not mathematically equivalent) to performing the frequency-to-time domain transformation on the block 810 shown in FIG. 8 rather than the block 701 shown in FIG. 7. For an arbitrary channel whose sub-carrier frequency $f_i$, the structure of the Fourier kernel assures that the adjacent and nearby channels (e.g. channels with sub-carrier frequencies $f_{i\pm k}$ where k is some small integer) will remain substantially orthogonal, while distant channels (e.g. channels $f_{i\pm j}$ where j>k) will not interfere with the channel $f_i$ due to the natural sidelobe decay. For a carrier at frequency $f_n$, the interference due to loss of orthogonality with carrier frequency $f_{n+1}$, $f_{n+k}$ is given by:

$$I_{n+1} = a_{n+1} \sin\left(c\left(\frac{f_{n+1} + \delta f - f_n}{\Delta f}\right)\right)^2 \approx a_{n+1} \frac{1}{(\pi(1+x))^2}$$

$$I_{n+k} = a_{n+k} \sin\left(c\left(\frac{f_{n+k} + \delta f - f_n}{\Delta f}\right)\right)^2 \approx a_{n+k} \frac{1}{(\pi(k+x))^2}$$

One can clearly see the interference from the above equation decreases in a quadratic sense as the carrier spacing increases Unlike the OFDM system, the sliding-window system allows carriers to be orthogonal, quasi-orthogonal, or non-orthogonal. Orthogonality is described mathematically as follows:

Let the set $\{\bar{x}_i\}$, i=0, 1, ... N−1 form an orthonormal basis set of length N, where $$\bar{x}_i = [x_{i,0} \; x_{i,1} \; \ldots \; x_{i,N-2} \; x_{i,N-1}]^T.$$

The following inner product relationship exists between the vectors:

$$\bar{x}_i(\bar{x}_j)^* = 0 \quad \text{for } i \neq j$$
$$= 1 \quad \text{for } i = j$$

where * denotes the complex conjugate. The basis set element vectors are therefore perfectly orthogonal to each other, and in matrix form this relationship can be written as:

$$X^T X = I \text{ where:}$$

$$X = \begin{pmatrix} x_{0,0} & x_{0,1} & \ldots & x_{0,N-2} & x_{0,N-1} \\ x_{1,0} & x_{1,1} & \ldots & x_{1,N-2} & x_{1,N-1} \\ \ldots & \ldots & \ldots & \ldots & \ldots \\ x_{N-2,0} & x_{N-2,1} & \ldots & x_{N-2,N-2} & x_{N-2,N-1} \\ x_{N-1,0} & x_{N-1,1} & \ldots & x_{N-1,N-2} & x_{N-1,N-1} \end{pmatrix}$$

and where, I denotes the identity matrix and $X^T$ is the complex conjugate transpose of the matrix X.

As a generalization, it is useful to define a measure of almost orthogonal and a measure of relative orthogonality that are closely tied to the concept of global and local orthogonality.

Let $$\{\bar{x}_i^A\}$$

be an approximation of the above defined basis function $\{\bar{x}_i\}$, i=0, 1, ... N−1, where the approximation can be a result of quantization noise, channel effects, etc. The approximation vectors are now not going to be exactly orthogonal to each other, thus the following relationship holds:

$$\bar{x}_i^A(\bar{x}_j^A)^* = 1 \mp \varepsilon_i \quad \text{for } i = j$$
$$= \delta_{ij} \quad \text{for } i \neq j$$

Then $$\bar{x}_1^A$$

is said to be more orthogonal to $$\bar{x}_2^A$$

than $$\bar{x}_3^A$$

if $|\delta_{12}| < |\delta_{13}|$.

Local orthogonality of the carriers can be defined as carriers being more orthogonal to carriers within a certain bandwidth and less orthogonal to carriers outside a certain bandwidth.

FIG. 9A shows a sliding-window system 900 that includes a transmitter 311 and a receiver 913. The transmitter 311 includes a modulator 320, an IFFT 321, and a D/A (Digital to Analog converter) 322. The receiver 913 includes an A/D (Analog to Digital converter) 323, a sliding-window transformer from the time domain to frequency domain, such as a Discrete Fourier Transform (DFT) 924, and a demodulator 925. Input data is provided to an input of the modulator 320. The modulator 320 assigns data bits (symbols) to each of the carriers, and modulates the carriers accordingly. The carriers are provided to the IFFT 321. The IFFT 321 converts the carriers (frequency domain) into samples (time domain). The time domain samples are serialized and provided to the D/A 322. The analog output of the D/A is provided, via the medium 112, to the A/D 323. The A/D 323 converts the analog samples into digital samples. The digital samples are provided to the sliding window transform 924. The sliding window transform 924 converts the digital samples (time domain) back into frequency domain values. The frequency domain values are provided to the demodulator 925. The demodulator 925 demodulates the values to extract the output data. One skilled in the art will recognize that other conventional operations, such as framing, blocking, and error correction can also be provided.

The use of a sliding-window transformation operation in the block 924 means that the number of input samples and the number of output channels can be different (unlike the FFT 324 where the number of inputs is usually equal to the number of outputs).

FIG. 9B shows the sliding-window transform system of FIG. 9A extended to multiple channels. In FIG. 9B the output of the A/D 323 is provided to an input of a first sliding-window transform 921, a second sliding-window transform 922, and an M-th sliding window transform 923. An output of the first sliding-window transform 921 is provided to an input of a first demapper 931. An output of the second sliding-window transform 922 is provided to an input of a second demapper 932.

Figure 10A:
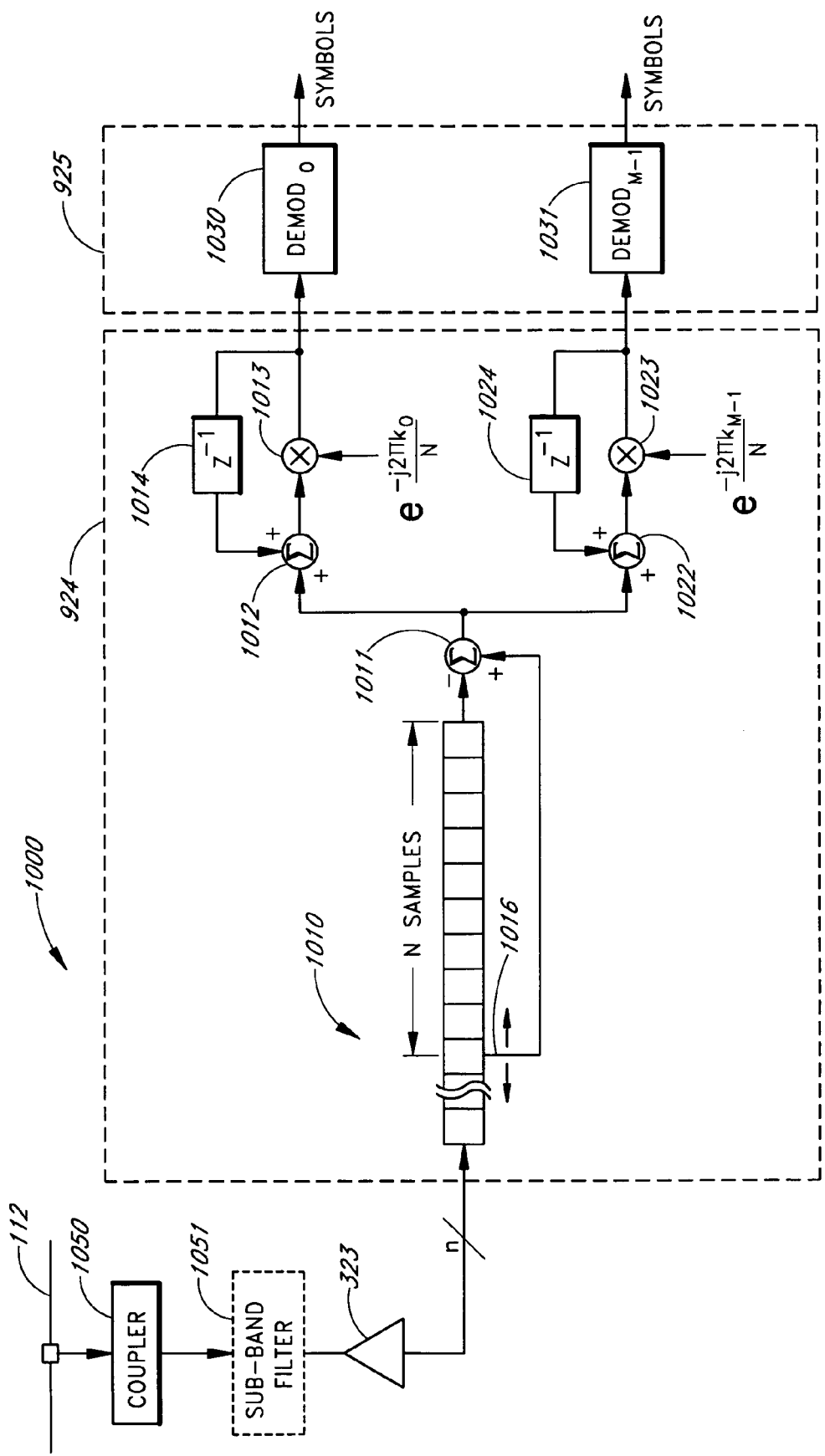
FIG. 10A is a block diagram of a sliding-window receiver that uses a Type-1 sliding window transform.

FIG. 10A is a block diagram of a sliding-window receiver 1000 that uses a Type-1 DFT transform. The receiver 1000 is one embodiment of the receiver 913 shown in FIG. 9A. The communication channel 112 is provided to an input of a coupler 1050. An output of the coupler 1050 is provided to an input of an optional sub-band filter 1051. An output of the filter 1051 is provided to an analog input of the analog-to-digital converter 323. In receiver 1000, the DFT 924 includes an adjustable N-word shift register 1010 having an adjustable tap 1016 that determines N. The shift register 1010 stores N n-bit words provided by the A/D 323. Each new digital sample from the A/D 323 is provided to a first word in the register 1010 and to a non-inverting input of an adder 1011. As each new sample is received, shift register 1010 shifts right one word. A last word of the shift register 1010 is provided to an inverting input of the adder 1011. An output of the adder 1011 is provided to a first input of an adder 1012 and to a first input of an adder 1022.

An output of the adder 1012 is provided to a first input of a multiplier 1013. A complex constant $\phi_0$ is provided to a second input of the multiplier 1013. The constant multiplier is calculated according to the equation $$\phi_i = e^{\frac{-j2\pi k_i}{N}}$$

where i is the channel, $k_i$ is the wave number for the carrier frequency represented by the channel i, and N is the number of samples.

An output of the multiplier 1013 is provided to an input of a single-sample time delay 1014 and to an input of a demodulator 1030. The demodulator 1030 is the demodulator for the first channel. An output of the time delay 1014 is provided to a second input of the adder 1012.

An output of the adder 1022 is provided to a first input of a multiplier 1023. A complex constant $\phi_{M-1}$ is provided to a second input of the multiplier 1023. An output of the multiplier 1023 is provided to an input of a single-sample time delay 1024 and to an input of a demodulator 1031. The demodulator 1031 is the demodulator for the last channel. An output of the time delay 1024 is provided to a second input of the adder 1022.

Figure 10B:
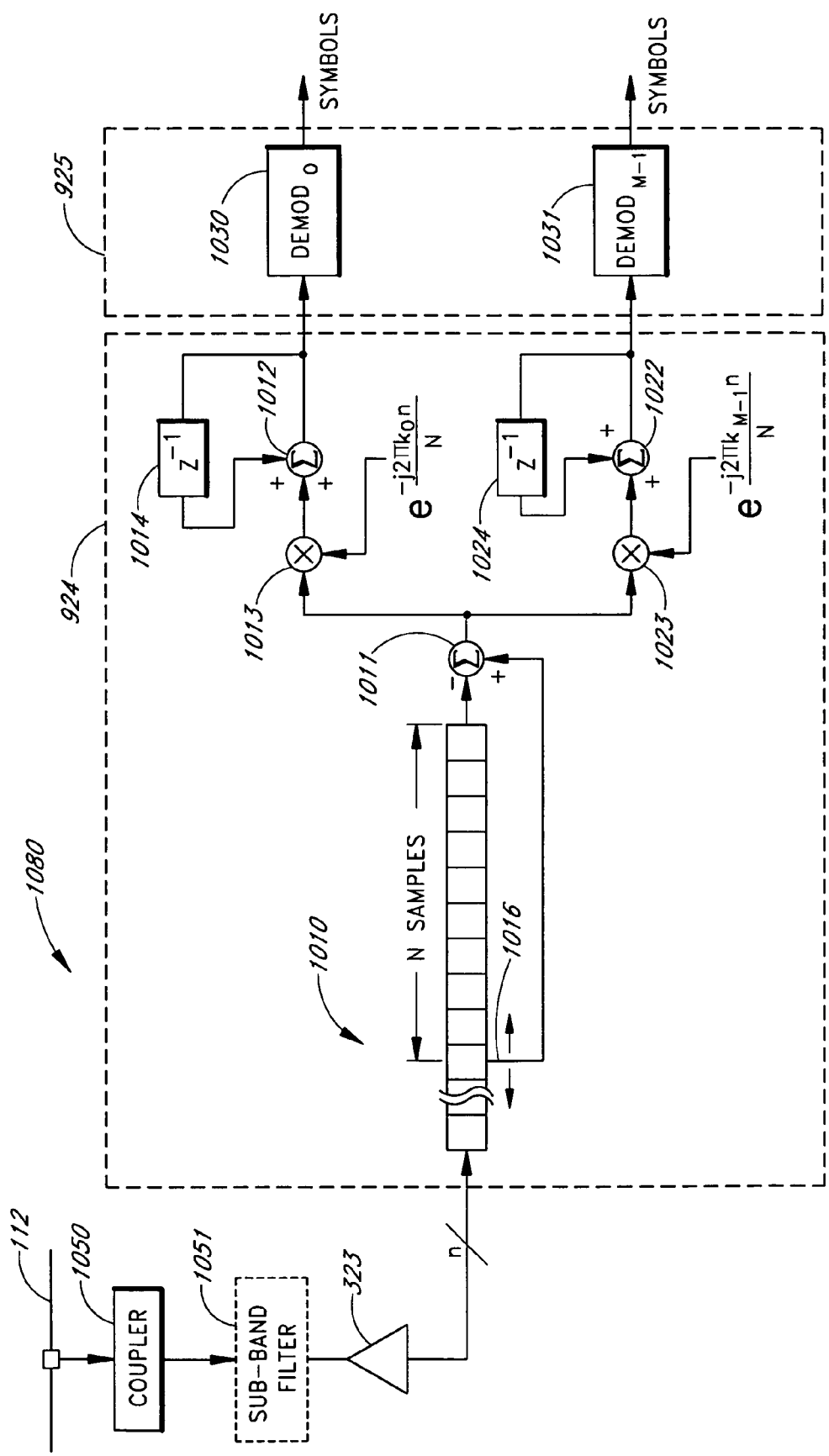
FIG. 10B is a block diagram of a sliding-window receiver that uses a Type-2 sliding window transform.

FIG. 10B is a block diagram of a sliding-window receiver 1080 that uses a Type-2 Fourier transform. The receiver 1080 is one embodiment of the receiver 913 shown in FIG. 9A. The receiver 1080 is similar to the receiver 1000, except in the ordering of the adders 1012, 1022 and the multipliers 1013,1023. In the receiver 1080, the output of the adder 1011 is provided to the first input of the multipliers 1013 and 1023. The complex sinusoid $$e^{\frac{-j2\pi k_0 n}{N}}$$

is provided to a second input of the multiplier 1013. The output of the multiplier 1013 is provided to the first input of the adder 1012. The complex constant $\phi_{M-1}$ is provided to a second input of the multiplier 1023. The output of the multiplier 1023 is provided to the first input of the adder 1022.

In the Type-1 transform, the numerical results produced by the multipliers 1013 and 1023 can grow and cause instability. This instability is unlikely to occur in the Type-2 transform. Thus, an advantage of the Type-2 transform is the relatively lower bit resolution needed for the multipliers 1013 and 1023.

One skilled in the art will recognize that only the first and last channels are shown explicitly in FIGS. 10A and 10B, and that the structure of the adder 1012, multiplier 1013, time delay 1014 and demodulator 1030 is repeated for channels 0 through M−2. The DFT 924 runs in a sliding-window mode (rather than the batch mode of the FFT 324). Thus, for each input sample from the A/D 323, the DFT 924 produces one output value to each of the demodulators 1030–1031.

The Type-1 transform is mathematically described as follows: Let $\hat{X}_n(k)$ (k=0, 1, ... N−1) be the N-point DFT of the sequence $$\{x[n-(N-1)], x[n-(N-2)], \ldots, x[n-1], x[n]\}$$

Then, from the definition of the DT, there exists a recursive relationship between $\hat{X}_n(k)$ and $\hat{X}_{n+1}(k)$ that is captured by the following recursive equation:

$$\hat{X}_{n+1}(k) = \left(\hat{X}_n(k) - x[n-(N-1)] + x[n+1]\right)e^{\frac{2j\pi k}{N}}$$

which can be calculated with N multiplications and 2N additions.

The Type-2 sliding window transform is computed as:

$$\hat{X}_n(\omega_l) = \sum_{m=n-N+1}^{n} x[m]e^{-j\omega_l m}$$

where $\hat{X}_n(\omega_l)$ corresponds to the Fourier transform of the previous N samples (from sample n) evaluated at the frequency $\omega_l$ corresponding to sub-channel l.

$$\ldots x[n-N-1], x[n-N], x[n-N+1], \ldots x[n-1], x[n], x[n+1], \ldots$$

The recursive relation for the above equation is as follows:

$$\hat{X}_n(\omega_l) = \hat{X}_{n-1}(\omega_l) + x[n]e^{-j\omega_l n} - x[n-N]e^{-j\omega_l(n-N)}$$

Here the new output equals the previous output with the newest mixed input added and the oldest mixed input subtracted. Noting that $e^{-j\omega_l n} = e^{j\omega_l(n-N)}$ for any bin, this can be further simplified to a form that puts the delay element prior to the multiplier:

$$\hat{X}_n(\omega_l) = \hat{X}_{n-1}(\omega_l) + (x[n] - x[n-N])e^{-j\omega_l n}$$

This is the form shown in FIG. 10B. This structure has several advantages. First only a real delay element is needed. Second, the word width of the delay element is that of the ADC data. Third, in one embodiment, the delay element can be shared for all bins.

The Type 1 and the Type 2 transforms have the same order of computational complexity. Let $$\hat{X}_n^1(k)$$

and $$\hat{X}_n^2(k)$$

be the discrete versions of the two forms of the sliding transform stated above. Then the following relationship applies:

$$\hat{X}_n^2(k) = \sum_{m=n-(N-1)}^{n} x[m] e^{\frac{-2\pi jkm}{N}}$$

Let $m' = m - (n-(N-1))$. Then the above summation reduces to the following:

$$\hat{X}_n^2(k) = \sum_{m'=0}^{N-1} x[m' + n - (N-1)] e^{\frac{-2\pi j(m' + n - (N-1))k}{N}}$$

$$= e^{\frac{-2\pi j(n-(N-1))}{N}} \sum_{m'=0}^{N-1} x[m' + n - N + 1] e^{\frac{-2\pi jkm'}{N}}$$

which implies that $$\hat{X}_n^2(k) = e^{\frac{-2\pi j(n-(N-1))}{N}} \hat{X}_n^1(k)$$

Thus when $n-(N-1) = kN$, $k = 0, \pm1, \pm2, \ldots$, the two transforms are equal when $n = -1, N-1, 2N-1$, and so on.

Figure 11:
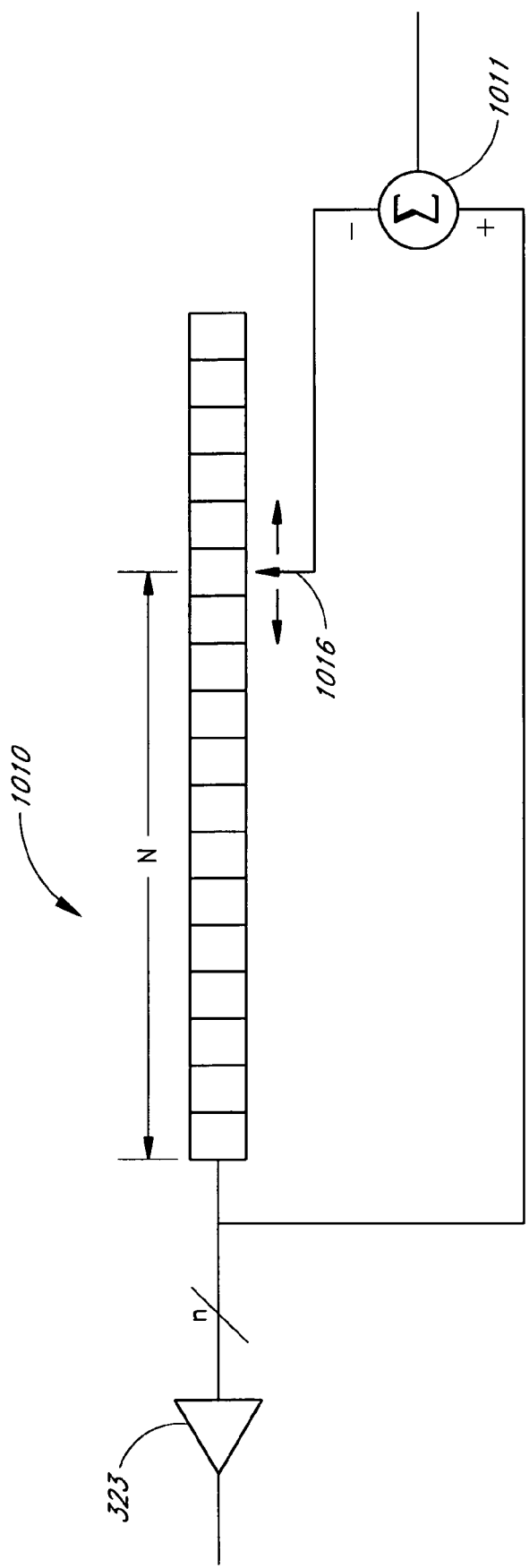
FIG. 11 is a block diagram of a sliding-window transform-based receiver that provides variable basis function length.

FIG. 11 shows an alternate embodiment of the adjustable shift register 1010. As shown in FIG. 11, the value of N (the number of words used in the DFT operation) can be easily varied by changing the output tap on the shift register 1010. In FIG. 11, the input to the inverting input of the adder 1011 is taken from a selected tap on of the shift register 1010 rather than the last tap. The value N (the length of the basis function) is the number of taps between the input tap and the output tap. The value of N can be reduced for shorter symbol times (corresponding to higher symbol rates) and the value of N can be lengthened for longer symbol times (corresponding to slower symbol rates). The adder 1011 can be replicated across all of the M channels to provide selection of the basis function length N independently on each channel. The basis function coefficients $\phi_i$ shown in FIG. 10A and in the above equation also depend on N. Thus, when N is changed for a specific channel, $\phi_i$ should typically be changed for that channel as well.

Figure 12:
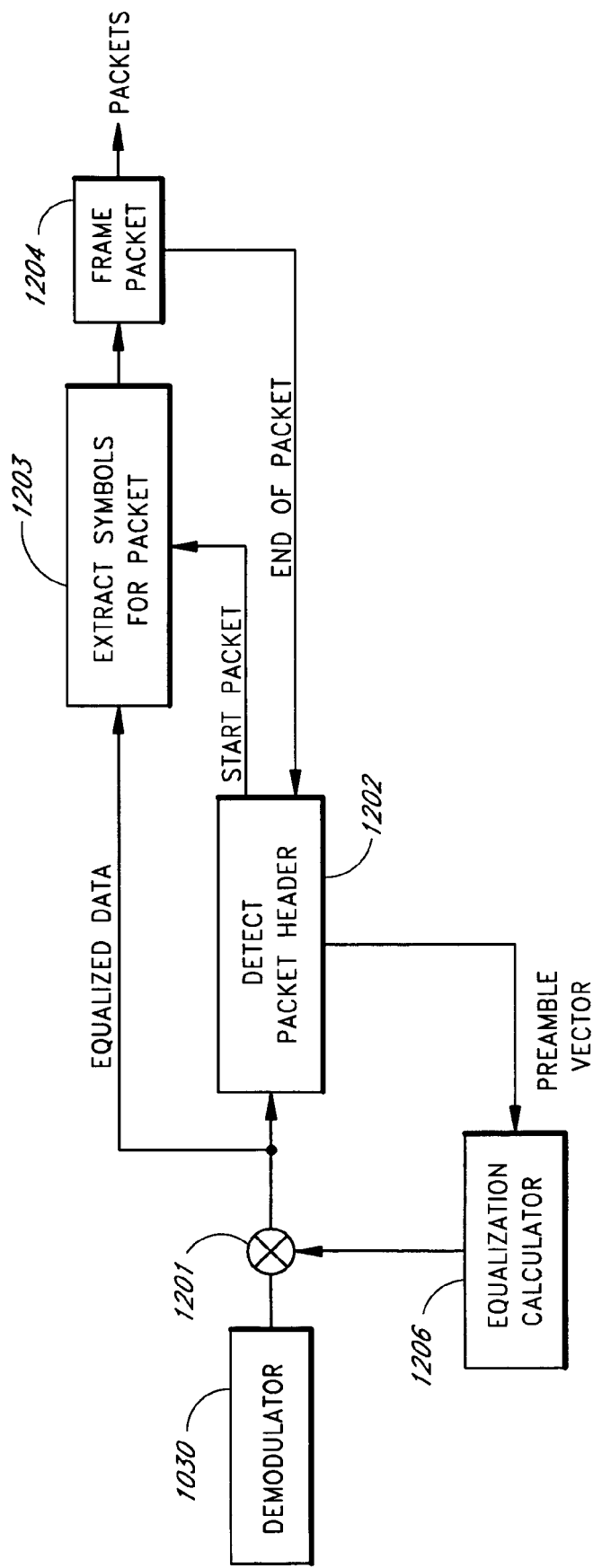
FIG. 12 is a block diagram of a channel equalizer for use with a sliding-window system.

As shown in FIG. 12, each of the separate channels can be separately equalized on a per-packet basis by applying a simple multiplying factor at the output of the demodulators (frequency domain equalization). In FIG. 12, an output of the demodulator 1030 is provided to a first input of a multiplier 1201. An output of the multiplier 1201 is provided to an input of a packet-header detector and to a data input of a symbol detector 1203. The symbol detector 1203 provides symbols to a framing module 1204. A packet output of the framing module 1204 provides received packets. The framing module 1204 provides an end-of-packet output to a packet-header detector 1202. An equalization-vector output of the packet-header detector 1202 is provided to an equalization calculator 1206. An equalization coefficient output from the equalization calculator 1206 is provided to a second input of the multiplier 1201. A packet-start output from the packet-header detector 1202 is provided to a packet-start input of the symbol detector 1203.

The packet-header detector 1202 receives signals from the demodulator via the multiplier 1201. The equalization calculator initially sets the equalization coefficient to a known value, such as, for example unity. The packet-header detector 1202 detects a packet preamble by searching for a predefined bit pattern in the received signals from the demodulator 1030. When the packet-header detector 1202 detects the bit pattern as a preamble vector $P_r$ having an amplitude and a phase. In one embodiment, the packet-header detector 1202 detects the preamble using a correlation process that outputs a correlation value as the preamble vector $p_r$. In one embodiment, the packet-header detector 1202 detects the preamble using a preamble filter that outputs a filter value as the preamble vector $p_r$. In one embodiment, the preamble filter is an adaptive filter. The received preamble vector $p_r$ is provided to the equalization calculator 1206, and a start-of-packet command is sent to the symbol detector 1203.

The equalization calculator 1206 calculates the equalization coefficient $c_e$ by comparing the actual received preamble vector $p_r$ with an expected preamble vector $p_e$. The equalization coefficient $c_e$ is provided to the multiplier 1201 to equalize the data from the demodulator 1030 for the packet corresponding to the detected preamble. The equalization coefficient $c_e$ equalizes the data received from the demodulator 1030 to reduce the effects of channel-induced distortions of the received signal.

After receiving the start-packet command from the packet-header detector 1202, the symbol detector 1203 receives equalized data, extracts symbols from the equalized data, and provides the symbols to the packet framer 1204. The packet framer 1204 frames the received symbols into packets.

Figure 13:
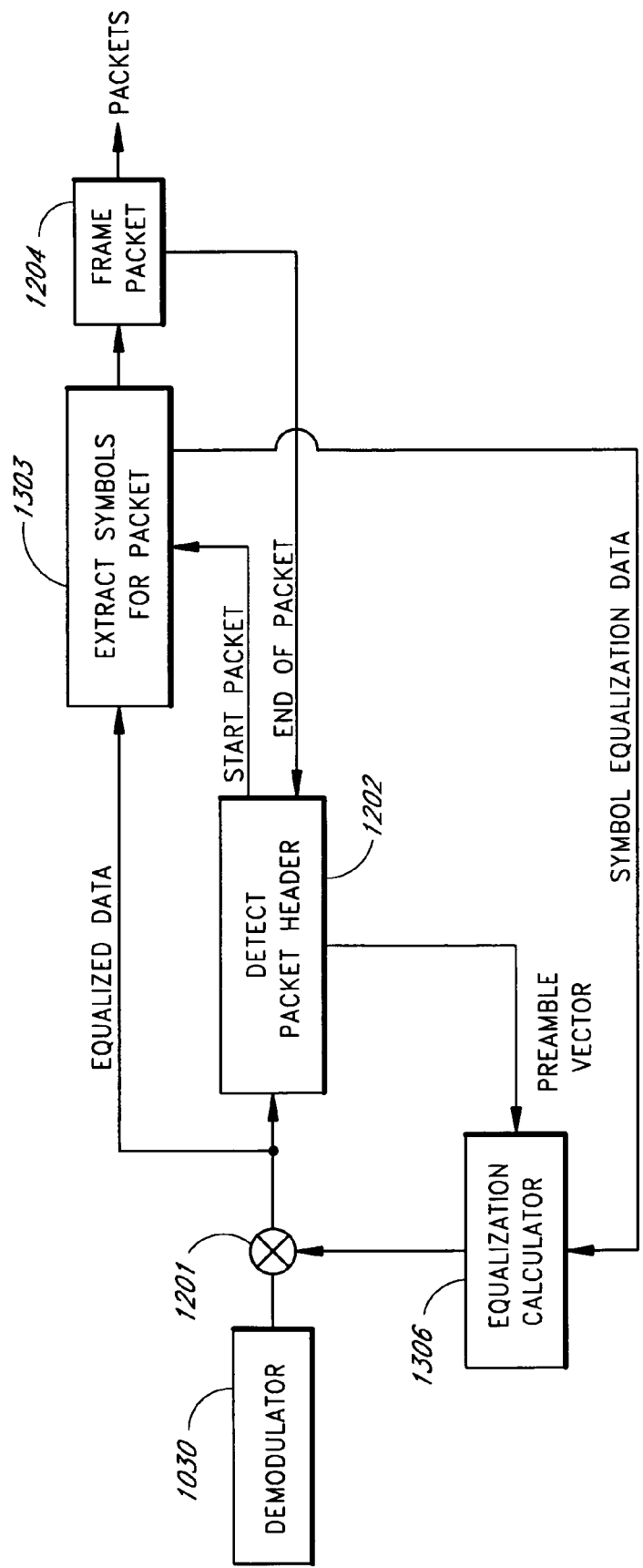
FIG. 13 is a block diagram of a packet-based equalization system.

As shown in FIG. 13, each of the separate channels can be separately equalized on a per-symbol basis by applying a simple multiplying factor at the output of the demodulators. In FIG. 13, an output of the demodulator 1030 is provided to a first input of the multiplier 1201. An output of the multiplier 1201 is provided to an input of the packet-header detector and to a data input of a symbol detector 1303. The symbol detector 1303 provides symbols to a framing module 1204 and symbol equalization data to an equalization calculator 1306. A packet output of the framing module 1204 provides received packets. The framing module 1204 provides an end-of-packet output to a packet-header detector 1202. An equalization-vector output of the packet-header detector 1202 is provided to the equalization calculator 1306. An equalization coefficient output from the equalization calculator 1306 is provided to a second input of the multiplier 1201. A packet-start output from the packet-header detector 1202 is provided to a packet-start input of the symbol detector 1303.

The packet-header detector 1202 receives signals from the demodulator via the multiplier 1201. As in the equalizer system shown in FIG. 12, in FIG. 13 the equalization calculator 1306 initially sets the equalization coefficient to a known value, such as, for example unity. The packet-header detector 1202 detects a packet preamble by searching for a predefined bit pattern in the received signals from the demodulator 1030. When the packet-header detector 1202 detects the bit pattern as a preamble vector $V_r$ having an amplitude and phase. The received preamble vector $p_r$, provided to the equalization calculator 1306, and a start-of-packet command is sent to the symbol detector 1303.

The equalization calculator 1306 calculates the equalization coefficient $c_e$ by comparing the actual received preamble vector $v_r$, with an expected preamble vector $p_e$. The equalization coefficient $p_e$ is provided to the multiplier 1201 to equalize the data from the demodulator 1030 for the packet corresponding to the detected preamble. The equalization coefficient $c_e$ equalizes the data received from the demodulator 1030 to reduce the effects of channel-induced distortions of the received signal.

After receiving the start-packet command from the packet-header detector 1202, the symbol detector 1303 received equalized data, extracts the first symbol from the equalized data, and provides the symbol to the packet framer 1204. The symbol detector 1303 also provides a received symbol vector $s_r$ and an expected symbol vector $s_e$ as symbol equalization data to the equalization calculator 1306. The received symbol vector $s_r$ is the actual vector detected for the received symbol, and the vector $s_e$ is the expected vector for that symbol. Upon receiving the vectors $s_r$ and $s_e$ the equalization calculator 1306 recalculates the equalization coefficient and provides the equalization coefficient to the multiplier 1201 to equalize the data for the next symbol.

This process is repeated for each symbol in the packet. The packet framer 1204 frames the received symbols into packets.

Clock Synchronization

Errors in the receiver (bit errors), will come from three principal sources. First, errors are due to noise in the channel. Noise errors are handled by establishing a suitable Signal to Noise Ratio and by error detection mechanisms such as Cyclic Redundancy Checks (CRC), error correction codes, and the like. Second, errors are caused by variations in the response (e.g., amplitude and phase response) of the channel. With a static or relatively static channel, the response-induced error will be constant and can be handled by frequency domain equalization, either on a packet-by-packet basis, or on a symbol-by-symbol basis.

The third major source of error is a phase rotation error caused by frequency differences between transmitter clock (the transmitter timebase) and the receiver clock (the receiver timebase). The frequency error between the transmitter timebase and the receiver timebase can be detected at the receiver as follows:

On the transmitter side, the transmitter generates a clock at a frequency $f_c$, expressed as:

The signal is sampled at a rate $$T_x = \cos(\omega_c t)$$

$$f_{sr} = 1/T_{sr} \text{ where } t = nT_{sr}.$$

$$T_x = \cos(\omega_c n T_{sr})$$

Thus:

Given N samples in a basis function, then $f_c T_{sr} = k_c/N$, where $k_c$ and N are integers, and thus:

$$T_x = \cos(2\pi f_c n T_{sr}) = \cos\left(\frac{2\pi n k_c}{N}\right)$$

At the receiver side, the receiver generates a clock signal $R_x$ given by:

$$R_x = \cos\left(\frac{2\pi n k}{N}\left(\frac{T_{rxsr}}{T_{sr}}\right)\right)$$

where $T_{rxsr}$ is based on the receiver timebase and thus the ration $T_{rxsr}/T_x$ will not necessarily be unity.

Assuming the transmitter sends two signals of length $T_s$ (a symbol time) with the same starting phase, then:

$$T_x = \cos\left(\frac{2\pi n k}{N}\right) \text{ for } n = 0 \ldots N_s - 1, 0 \leq t \leq T_s$$

$$T_x = \cos\left(\frac{2\pi n k}{N}\right) \text{ for } n = 0 \ldots N_s - 1, T_s \leq t \leq 2T_s$$

Performing a Fourier Transform of the above yields the same values. However, on the receiver side $$R_x = \cos\left(\frac{2\pi n k}{N}\left(\frac{T_{rxsr}}{T_{sr}}\right)\right) \text{ for } n = 0 \ldots N_s - 1, 0 \leq t \leq T_s$$

$$R_x = \cos\left(\frac{2\pi n k}{N}\left(\frac{T_{rxsr}}{T_{sr}}\right) + \varphi\right) \text{ for } n = 0 \ldots N_s - 1, T_s \leq t \leq 2T_s$$

where $$\varphi = k\frac{2\pi N_s}{N}\left[\frac{T_{rxsr}}{T_{sr}} - 1\right]$$

The above can be rewritten as a frequency error defined as $$\Delta f = \frac{1}{T_{rxsr}} - \frac{1}{T_{sr}};$$

$$\Delta f = -f_{rxsr}\frac{N\varphi}{2\pi N_s k}$$

For multiple channels, the value of φ and k become channel-dependent such that a channel-to-channel frequency error for channel i can be expressed as:

$$\Delta f_i = -f_{rxsr}\frac{N\varphi_i}{2\pi N_s k_i}$$

If the frequency offset between the transmitter timebase and the receiver timebase is the only error, then the error in all channels would be the same, thus for channels i and j:

$$\Delta f_i = \Delta f_j$$

Thus, the frequency error $\Delta f_{ave}$ in the receiver timebase can be calculated as the average of the errors $\Delta f_i$ for a number of channels. In one embodiment, the frequency error $\Delta f_{ave}$ is used to change the frequency of a variable-frequency receiver clock, such as, for example, a Voltage Controlled Oscillator (VCO), to synchronize the frequency of the receiver clock with the frequency of the transmitter clock.

Coarse Symbol Synchronization and AGC

The transmitter inserts a known symbol pattern, known as a preamble, at the front of each packet. The receiver senses the start of a packet by looking for the preamble on a quiet channel. In addition to detection of the start of a packet, the receiver can use the preamble to provide coarse synchronization of the symbol-detector, and automatic gain control (AGC). The packet detector operates by searching for a transition from a first symbol to a second symbol.

To compare the equivalence of two symbols, an inner product p(t) is calculated as:

$$p(t) = \int_t^{t+T_b} f(\tau)f^*(\tau + T_b)d\tau$$

where $T_b$ is the basis function length. In a discrete-time system, where f(t) is the sum of M sinusoids, then f(t) can be written as:

$$f(t) = \sum_{i=0}^{M-1} A_i\cos(2\pi f_i t + \varphi_i)$$

where $f_i$ is limited to frequencies that have an integral number of periods in $T_b$. Thus, in the above equation:

$$f_i = \frac{k_i}{N_b T_{sr}}$$

where $N_b$ is the number of samples in a basis function, and $T_{sr}$ is the sample time such that the sampled waveform is of the form:

$$f(n)=f(t)|_{t=nT_{sr}}$$

Then:

$$f(n) = \sum_{i=0}^{M-1} A_i\cos\left(\frac{2\pi k_i}{N_b T_{sr}}nT_{sr} + \varphi_i\right) = \sum_{i=0}^{M-1} A_i\cos\left(\frac{2\pi k_i n}{N_b} + \varphi_i\right)$$

Expressing p(t) in discrete time as:

$$p(n) = \sum_{m=n}^{n+N_b-1} f(m)f(m+N_b)$$

then if the basis functions are orthogonal, the above equation simplifies to:

$$p(n) = \sum_{i=0}^{M-1} \frac{A_i^2}{2} N_b$$

which is a positive constant over time.

The inner product p(n) should be a relatively large positive constant when the second symbol of the preamble is detected. This peak is used to "start" the symbol detector in the receiver. When a relatively large number of samples is used for each basis function, then p(n) can be computed using only the sign bit of each sample.

Several variations of the above can also be used. For example, where the symbols have a symbol time $N_S$, then p(n) can be calculated as:

$$p(n) = \sum_{i=0}^{M-1} \frac{A_i^2}{2} N_s$$

If the preamble starts with three symbols, where the first two are the same and the third symbol is 180° out of phase, then p(n) will show one relatively large positive peak followed by a negative peak. The two peaks can be used to provide a coarse synchronization for the receiver. This can be easily accomplished by correlating p(n) with the sequence s(n)=1, 0, . . . 0, −1, where the 1 and the −1 are separated by the known distance between the two correlation peaks. The output of the correlation of p(n) with the sequence s(n) is the coarse synchronization for the receiver's symbol detector.

The detection of a peak in p(n) indicates that there is a valid signal on the channel (without the need for high-precision calculations). Only the sign bit is needed for the inner product, so the AGC does not need to be fully engaged. The AGC can be floating (moving gain) until the valid signal is detected. Once the signal is detected, the energy in the signal can be calculated and the gain of the AGC can be set and locked for the duration of the received packet.

Figure 14:
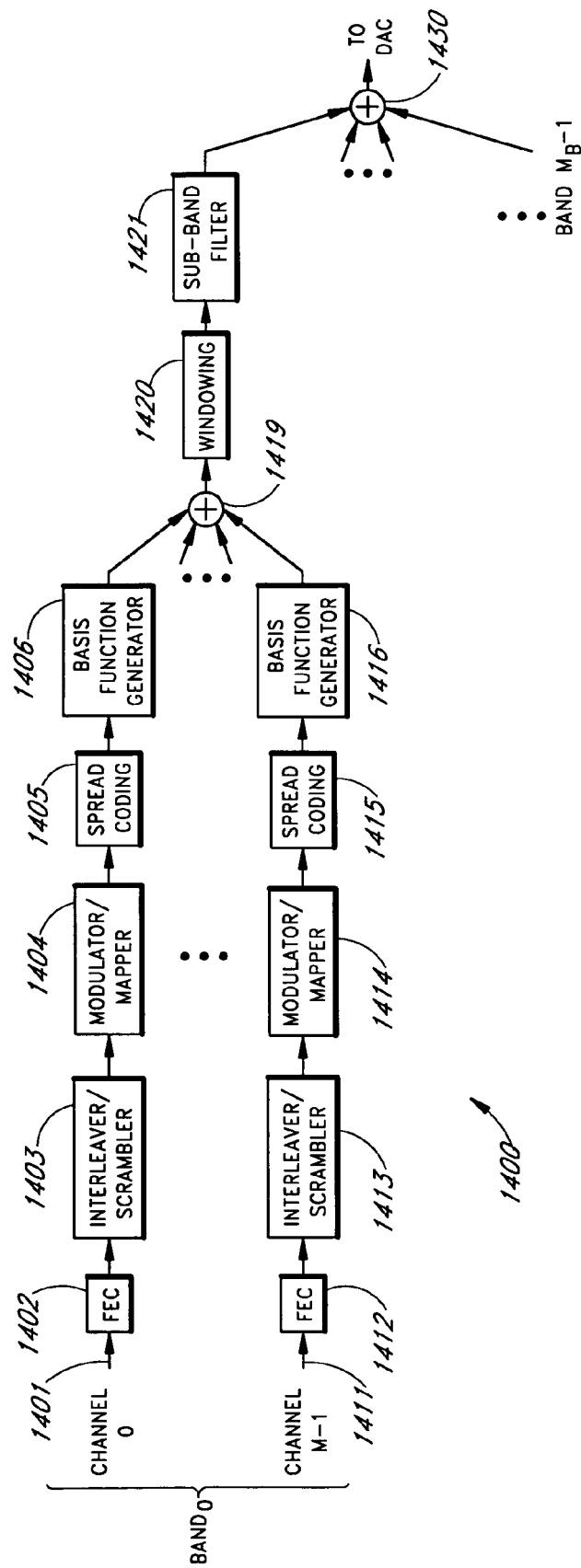
FIG. 14 is a block diagram of a multi-band transmitter for use with a multi-band sliding-window receiver.

FIG. 14 is a block diagram of a multi-band transmitter 1400 for use with a multi-band sliding-window receiver. In the transmitter 1400, data for a first channel (i.e., channel 0) of an M-channel band (i.e., Band 0) is provided to an input of an FEC block 1402. An output of the FEC block 1402 is provided to an input of an interleaver/scrambler block 1403. An output of the block 1403 is provided to an input of a modulator/mapper block 1404. An output of the block 1404 is provided to an input of a PAR (spread) coding block 1405. An output of the block 1405 is provided to an input of a basis function generator 1406. An output of the basis function generator 1406 is provided to a first input of an adder 1419.

Data for an M-th channel (i.e., channel M-1) of the M-channel band (i.e., Band 0) is provided to an input of an FEC block 1412. An output of the FEC block 1412 is provided to an input of an interleaver/scrambler block 1413. An output of the block 1413 is provided to an input of a modulator/mapper block 1414. An output of the block 1414 is provided to an input of a PAR coding block 1415. An output of the block 1415 is provided to an input of a basis function generator 1416. An output of the basis function generator 1416 is provided to an M-th input of the adder 1419.

An output of the adder 1419 is provided to an input of a windowing filter 1420. An output of the windowing filter 1420 is provided to an input of a sub-band filter 1421. An output of the sub-band filter is provided to a first input of an adder 1430. The transmitter structure for bands other than Band 0 is similar to that of Band 0. The adder 1430 has $M_B$ inputs, where $M_B-1$ is the number of bands. Thus, the output of the adder 1430 is the sum of all bands 0 through $M_B-1$. The output of the adder 1430 is provided to a digital-to-analog converter (not shown) to convert the transmitter signal into an analog signal for transmission on the communication medium.

The FEC blocks 1402 and 1412 provide calculation of Forward Error Correction (FEC) codes. The interleaver/scrambler blocks 1403 and 1413 interleave data bits and optionally scramble the data bits to improve transmission properties of the data. For example, in one embodiment, the interleaver/scrambler provides Run Length Limited (RLL) coding of the data bits. The modulator/mapper blocks 1404 and 1414 map the bits into symbols. The PAR spread coding blocks 1405 and 1415 provide calculation of spreading codes that improve the PAR of the transmitted output signal. The basis function generator blocks 1406 and 1416 convert the symbols into basis functions (e.g., modulated sine waves) for transmission.

The adder 1419 sums all of the channels in Band 0. The windowing filter 1420 provides a first stage of filtering to ensure that the spectrum of Band 0 is within desired limits and does not produce spectral components at unwanted frequencies (i.e., frequencies forbidden by law, frequencies forbidden by practical considerations, etc.) The sub-band filter 1421 provides a second stage of filtering to shape the spectrum of Band 0 so as to reduce interference with other bands (e.g., Band 1). One skilled in the art will recognize that the filters (or windows) 1420 and 1421 can be combined or further subdivided.

One skilled in the art will recognize that the FEC blocks 1402 and 1412, the interleaver/scrambler blocks 1403 and 1413, the spread coding blocks 1405 and 1415, and the filters 1420 and 1421 are optional and can be omitted in whole or in part. However, one skilled in the art will recognize that the FEC blocks 1402 and 1412, the interleaver/scrambler blocks 1403 and 1413, the spread coding blocks 1405 and 1415, and the filters 1420 and 1421 improve the overall performance of the transmitter 1400 at the cost of some additional complexity.

In one embodiment, the spreading codes are derived from the classical Rudin-Shapiro polynomials and have a crest factor (defined as the maximum signal value divided by the RMS signal value) less than $\sqrt{2}$. The mathematical theory of the RSONS (Rudin-Shapiro orthonormal sequence) system are derived from the Shapiro transform of the unimodular sequence. Let $(\alpha_0, \alpha_1, \ldots)$ be any infinite sequence of unimodular complex numbers. Then a sequence $(P_m, Q_m)$ of polynomial pairs (with unimodular coefficients and common length $2^m$ is inductively defined as $$P_0(x)=1; Q_0(x)=1$$

and $$P_{m+1}(x)=P_m(x)+\alpha_m x^{2^m} Q_m(x)$$

$$Q_{m+1}(x)=P_m(x)-\alpha_m x^{2^m} Q_m(x)$$

For the construction of RSONS matrices it is assumed that the parameters $\alpha_0, \alpha_1, \ldots$ will only take on values +or-1. Other choices also have interesting applications.

There are typically two ways of defining the RSONS sequence. The first involves generation using the concatenation rule. The second comes from the lexicographical ordering of the set of all finite sequences:

$$\begin{pmatrix} A \\ B \end{pmatrix} \rightarrow \begin{pmatrix} A & B \\ A & -B \\ B & A \\ B & -A \end{pmatrix}$$

where A and B are two consecutive matrix rows, starting from the 2×2 matrix:

$$P_2 = \begin{pmatrix} 1 & 1 \\ 1 & -1 \end{pmatrix}$$

The PONS matrix (P of dimension $2^m$) is a Hadamard matrix of order $2^m$. Denoting $A_r(z)$ the polynomial associated with the $r^{th}$ row then $$|A_{2r}(z)|^2 + |A_{2r+1}(z)|^2 = 2L$$

or, in other words, they are Golay complimentary pairs Every row polynomial is QMF i.e.

$$|A_r(z)|^2 + |A_r(-z)|^2 = 2L \text{ for all } |z|=1$$

The two halves of the row polynomial are dual, each of these two halves are dual, and so on. This splitting property is useful for applications related to energy spreading Every row polynomial has a crest factor $\leq \sqrt{2}$. Let $c_j$ denote the aperiodic autocorrelation of that RSONS row. Then the maximal estimate is:

$$\max_{1 \leq j \leq L-1} |c_j| \leq (K(L))^{0.73}$$

where K is an absolute constant. The energy spreading properties of the RSONS sequences are well suited to addressing the problem of controlling the peak to mean envelope power ratio for OFDM systems. The rows of the RSONS matrix together with their antipodal counterparts, can be identified with a co-set of the first order Reed-Muller code inside a second order code thereby establishing a connection between the RSONS sequences and the classical FEC codes.

Figure 15:
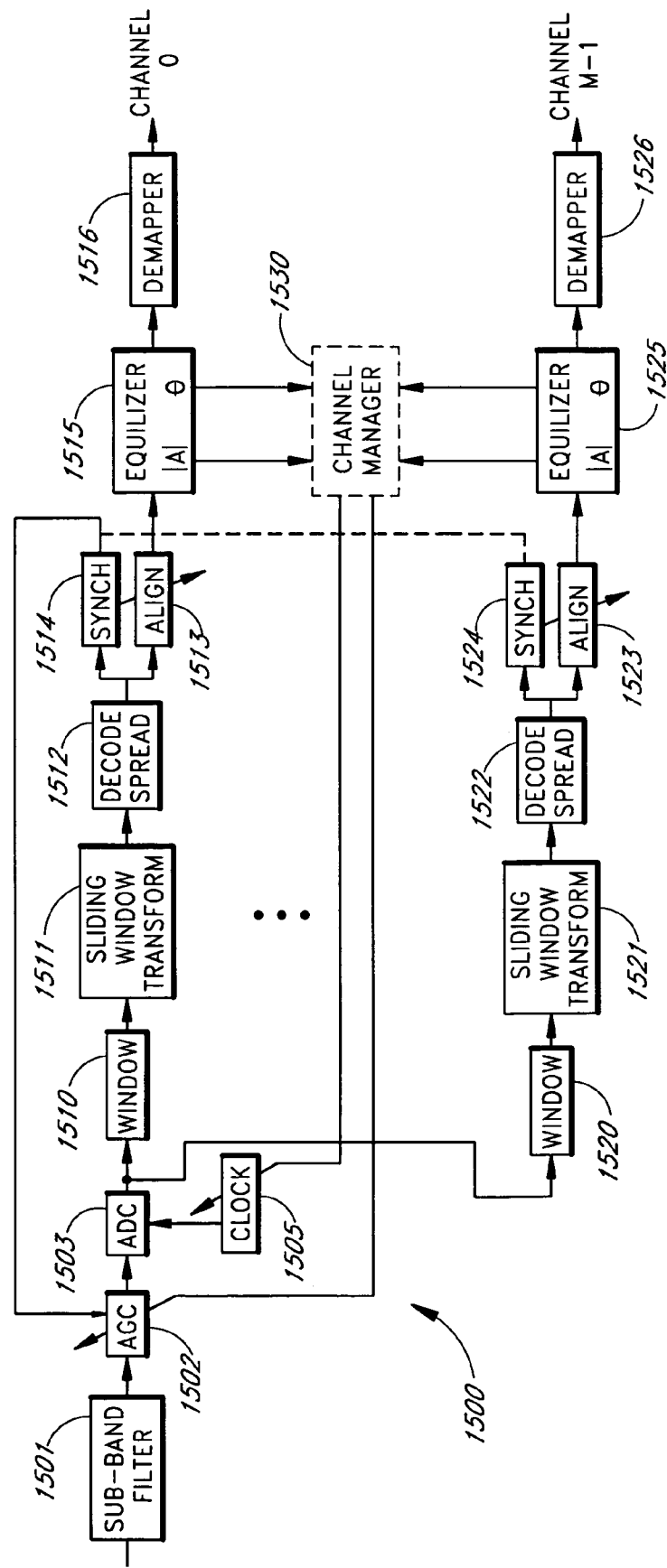
FIG. 15 is a block diagram of a multi-band sliding-window receiver.

FIG. 15 is a block diagram of a multi-band sliding-window receiver 1500 showing the receiver elements for one band. In the receiver 1500, a received analog signal is provided to a first input of a sub-band filter 1501. An output of the sub-band filter 1501 is provided to a signal input of an Automatic Gain Control (AGC) block 1502. An output of the AGC 1502 is provided to an analog input of an Analog-to-Digital Converter (ADC) 1503. An output from a clock 1505 is provided to a clock input of the ADC 1503. A digital output of the ADC is provided to an input of a first channel (Channel 0) windowing filter 1510 and to an input of an M-th channel (Channel M−1) windowing filter 1520.

An output of the windowing filter 1510 is provided to an input of a sliding-window transform 1511. An output of the sliding window transform 1511 is provided to an input of a spread decoder 1512. An output of the spread decoder 1512 is provided to an input of a synchronization block 1514 and to an input of a data-aligner 1513. An alignment-control output from the synchronization block 1514 is provided to a control input of the data-aligner 1513. An output of the data-aligner 1513 is provided to an equalizer 1515. An output of the equalizer 1515 is provided to an input of a demapper 1516. An output of the demapper 1516 is the data stream corresponding to Channel 0. An AGC control output from the synchronizer 1514 is provided to a reset input of the AGC 1502.

An output of the windowing filter 1520 is provided to an input of a sliding-window transform 1521. An output of the sliding window transform 1521 is provided to an input of a spread decoder 1522. An output of the spread decoder 1522 is provided to an input of a synchronization block 1524 and to an input of a data-aligner 1523. An alignment-control output from the synchronization block 1524 is provided to a control input of the data-aligner 1523. An output of the data-aligner 1523 is provided to an equalizer 1525. An output of the equalizer 1525 is provided to an input of a demapper 1526. An output of the demapper 1526 is the data stream corresponding to Channel M−1.

An optional channel manager 1530 provides improved performance for the receiver 1500. A magnitude output and a phase output from each of the equalizers 1515 and 1525 are provided to respective inputs of the channel manager 1530. A clock control output from the channel manager 1530 is provided to a control input of the clock 1505. An AGC-control output from the channel manager 1530 is provided to a gain-control input of the AGC 1502.

In the receiver 1500, the sub-band filter 1501 selects portions of the spectrum that correspond to the desired band. The sub-band filter 1501 can be implemented as an active filter, a passive filter, a Surface Acoustic Wave (SAW) filter, etc. The AGC 1502 adjusts the gain of the analog signal to a desired level. The spreading decoder 1512 and 1522 decodes the spreading codes (if any) applied in the transmitter. The optional window blocks 1510 and 1520 provide pre-transform filtering of the spectrum for each of the desired channels within the band. The sliding-window transform blocks 1511 and 1521, the synchronization blocks 1514 and 1524 and the data aligner blocks 1513 and 1523 function as described previously herein (and as described, for example, in connection with FIGS. 10–13 and in copending U.S. application Ser. No. 09/794761 hereby included by reference in its entirety). The equalizers 1515 and 1525 equalize the amplitude and phase of each channel. The demappers 1516 and 1526 map symbols back into data bits.

The control signal from the synchronizer 1514 to the AGC 1502, and an optional control signal from the synchronizer 1524 to the AGC 1502 are reset signals that signal the AGC when a false packet header is detected. When a false header is detected, the reset signal returns the AGC to its initial hunt mode, wherein the AGC corrects gain based on an internal feedback loop. The control signal from the channel manager 1530 to the AGC 1502 sets the AGC to a fixed gain, based on magnitude data provided by the equalization blocks 1515 and 1525. In one embodiment, the channel manager 1530 sets the AGC 1502 to an average gain of the channel equalizers. In one embodiment, the channel manager 1530 sets the AGC 1502 to a maximum gain of the channel equalizers.

The sliding-window receiver 1500 performs synchronization on a channel-by-channel basis (unlike in a conventional system where the symbol and frequency synchronization is done for channels on a block basis). The individual channels are separately equalized by applying a simple multiplying factor at the output of the data aligners (demodulators) 1513 and 1523.

The output of the sliding window transform on each channel is differentially detected. Differential detection is done by comparing each symbol with a previous symbol on the same sub-carrier. Differential detection is done on a channel by channel basis, which makes it relatively simple in the sliding-window system. The output of the sliding window transform at the receiver for each channel is delayed by one symbol by the programmable delay and the phase difference is calculated by multiplying the current output with the conjugate of the sample one symbol earlier. The use of a programmable delay allows the symbol time to be changed in order to optimize the channel data rate as function of the delay spread across that channel. When the delay spread across a particular channel is smaller, then a shorter symbol time can used for that channel. The phase of the output of the multiplier is the phase difference between the two samples.

At the receiver, the sliding window transform output of symbol i and sub-carrier j can be written as $$r_{ij}=e^{i\theta_{ij}}$$

Where $\theta_{ij}$ is the differentially encoded phase in symbol i and sub-carrier j.

Since differential phase detection is performed by multiplying each output with the conjugate of the previous symbol (which therefore eliminates the dependence on the reference symbol), then:

$$d_{ij}=r_{ij}r^*_{i-1,j}=e^{i(\theta_{ij}-\theta_{i-1,j})}=e^{i\phi_{ij}}$$

where $\phi_{ij}$ is the desired phase. In practice, other phase adjustments and amplitude corrections can be provided to correct, for example, channel effects, numerical effects, etc.

Since the symbol time is typically greater than the basis function length, the redundancy (which is usually just an extension of the signal) can be exploited to determine the channel characteristics including attenuation and phase distortion for that particular channel. This can be achieved, in part, since the sliding window transform processes N successive samples and the relationship between the transform of blocks as the window is sliding through the symbol length. More specifically, the relationship between the DFT of a block S and a block S' where S={$a_0, a_1, \ldots, a_{N-1}$} and $S'=\{a_{N-M}, a_{N-M+1}, \ldots, a_{N-M-1}\}$ for a channel whose carrier frequency index p is given by:

$$X_{s'}(p) = e^{-2\pi ip/N} X_s(p)$$

Given $x_{ij}$, then the sliding window output for carrier i and symbol j is:

$$X_{ij} = a_{ij} e^{i(\theta_{ij} + \phi_{ij})}$$

where $a_{ij}$ is the channel attenuation, $\theta_{ij}$ is the differentially encoded phase, and $\phi_{ij}$ is the phase distortion.

Since differential detection multiplies the sliding window transform output of carrier i and symbol j with the conjugate output of carrier i and symbol j−1, then $$r_{do} = X_{ij}(X_{ij-1})^* = a_{ij} a_{ij-1} e^{i(\theta_{do} + \phi_{ij} - \phi_{ij-1})}$$

Both of the sliding-window transforms (Type-1 and Type-2) can be implemented using a Coordinate Rotation DIgital Computer (CORDIC)-based systolic architecture. For the sliding window Fourier-type transforms (Type-1), the DFT of a window $W_n(i)$ of complex data elements $x[i], x[i+1], \ldots, x[i+N-1]$ is given by:

$$X_1(i) = \sum_{n=0}^{N-1} x[i+n] e^{\frac{-j2\pi kn}{N}} \text{ for } k = 0, 1, 2, \ldots, N-1$$

Since $x_1(k)$ and $x[i+n]$ are complex, they can be written in terms of real and imaginary parts as:

$$X_i(k) = P_i(k) + jQ_i(k)$$

$$X[i+n] \times p[i+n] + jq[i+n]$$

Rewriting the DFT in terms of the real and imaginary parts gives:

$$P_i(k) + jQ_i(k) = \sum_{n=0}^{N-1} (p[i+n] + jq[i+n]) \left( \cos\left(\frac{2\pi kn}{N}\right) - j\sin\left(\frac{2\pi kn}{N}\right) \right) =$$

$$\sum_{n=0}^{N-1} \left( p[i+n]\cos\left(\frac{2\pi kn}{N}\right) + q[i+n]\sin\left(\frac{2\pi kn}{N}\right) \right) +$$

$$j\sum_{n=0}^{N-1} \left( q[i+n]\cos\left(\frac{2\pi kn}{N}\right) - p[i+n]\sin\left(\frac{2\pi kn}{N}\right) \right)$$

or in matrix-vector form as $$\begin{bmatrix} P(k) \\ Q_1(k) \end{bmatrix} = \sum_{n=0}^{N-1} R\left(\frac{-2\pi kn}{N}\right) \begin{bmatrix} p[i+n] \\ q[i+n] \end{bmatrix} \text{ for } k = 0, 1, \ldots, N-1$$

where $$R(\theta) = \begin{bmatrix} \cos(\theta) & -\sin(\theta) \\ \sin(\theta) & \cos(\theta) \end{bmatrix}$$

The recursive update between the DFT's of two consecutive windows can be obtained as:

$$\begin{bmatrix} P_{i+1}(k) \\ Q_{i+1}(k) \end{bmatrix} = R\left(\frac{2\pi k}{N}\right) \begin{bmatrix} P_i(k) + p[i+N] - p[i] \\ Q_i(k) + q[i+N] - q[i] \end{bmatrix}$$

In order to update a transform element, only one CORDIC rotation is required. For a sliding window transform Type-2, the recursive update between the DFT's of two consecutive windows can be obtained as:

$$\begin{bmatrix} P_{i+1}(k) \\ Q_{i+1}(k) \end{bmatrix} = \begin{bmatrix} P_i(k) \\ Q_i(k) \end{bmatrix} + R\left(\frac{2\pi k}{N}\right) \begin{bmatrix} p[i+N] - p[i] \\ q[i+N] - q[i] \end{bmatrix}$$

Figure 16:
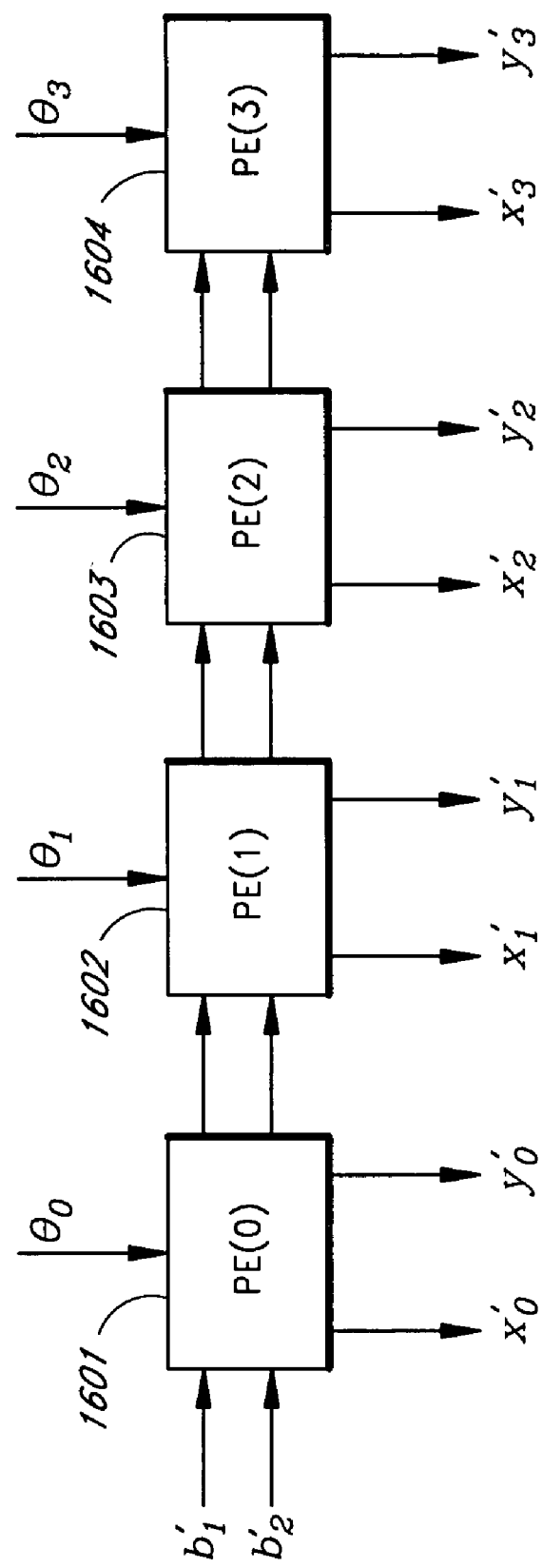
FIG. 16 is a block diagram of a CORDIC implementation of the sliding window transform with four processing element stages corresponding to the window length used.

FIG. 16 is a block diagram implementation of the sliding window transform using the CORDIC with four processing elements 1601–1604. Input data values $b_1$ and $b_2$ are provided to respective inputs of the processing element 1601. Output data values $b_1'$ and $b_2'$ from processing element 1601 are provided to respective inputs of the processing element 1602. Output data values $b_1'$ and $b_2'$ from processing element 1602 are provided to respective inputs of the processing element 1603. Output data values $b_1'$ and $b_2'$ from processing element 1603 are provided to respective inputs of the processing element 1604. A rotation value $\theta_0$ is provided to a theta input of the processing element 1601. A rotation value $\theta_1$ is provided to a theta input of the processing element 1602. A rotation value $\theta_2$ is provided to a theta input of the processing element 1603. A rotation value $\theta_3$ is provided to a theta input of the processing element 1604. Each of the processing elements 1601–1604 provides respective outputs x' and y'.

Figure 17A:
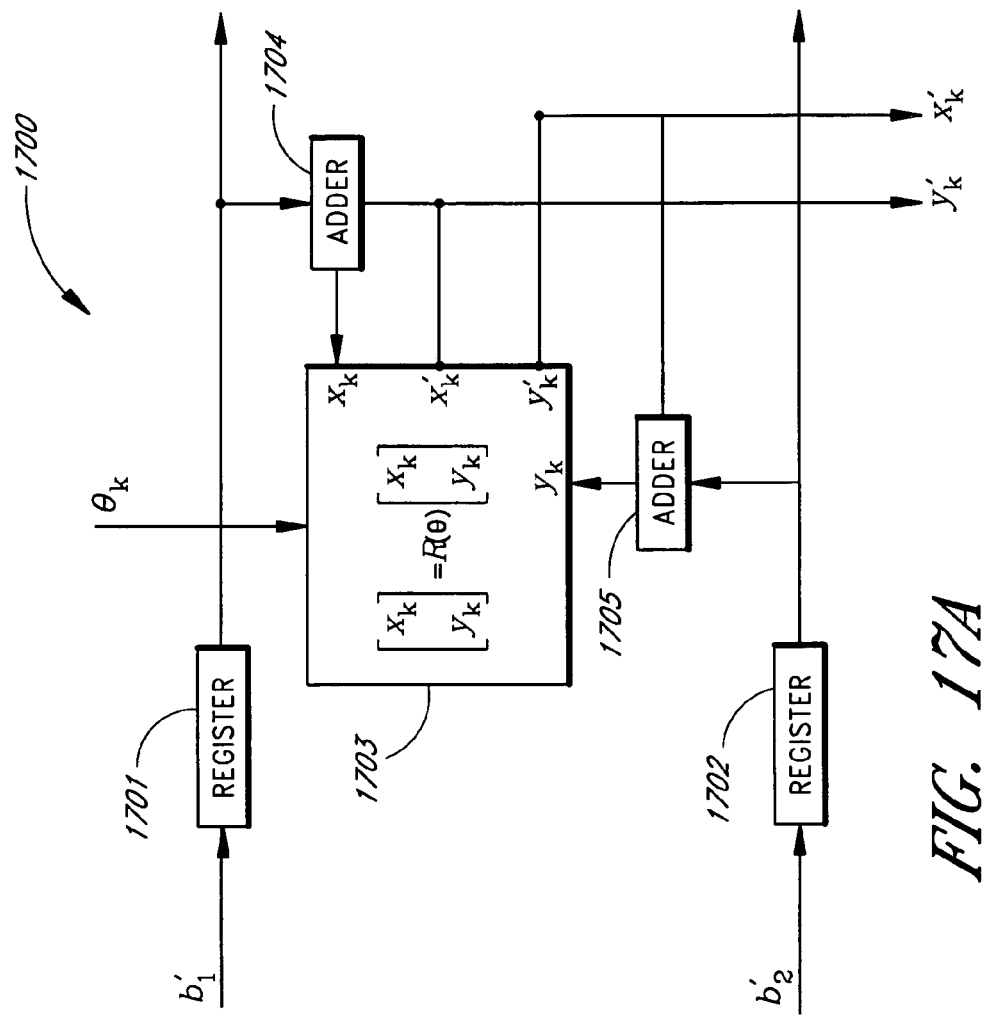
FIG. 17A is a block diagram of a CORDIC processing element that implements the Type-1 transform shown in FIG. 10A.

FIG. 17A is a block diagram of a CORDIC processing element 1700 that implements the Type-1 transform shown in FIG. 10A. In the processing element 1700, the input $b_1$ is provided to an input of a register 1701, and the input $b_2$ is provided to an input of a register 1702. An output of the register 1701 is provided to a first input of an adder 1704 and to the output $b_1'$. An output of the register 1702 is provided to a first input of an adder 1705 and to the output $b_2'$. The input $\theta_k$ is provided to a rotation input of a CORDIC rotation block 1703. An output of the adder 1704 is provided to a first data input, $x_k$, of the rotation block 1703, and an output of the adder 1705 is provided to a second input, $y_k$, of the rotation block 1703. A first data output, $x_k'$, from the rotation block 1703 is provided to a second input of the adder 1704, and a second data output, $y_k'$, from the rotation block 1703 is provided to a second input of the adder 1705.

Figure 17B:
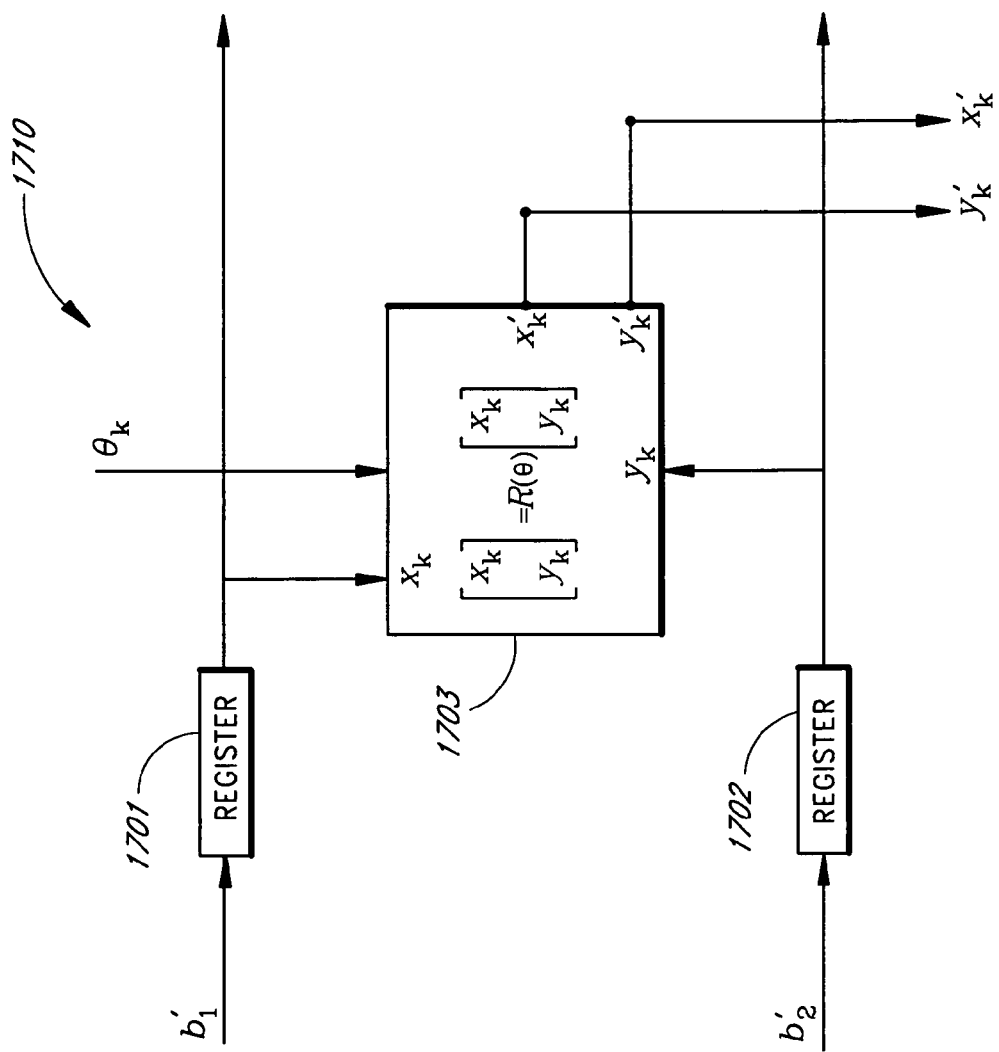
FIG. 17B is a block diagram of a CORDIC processing element that implements the Type-2 transform shown in FIG. 10B.

FIG. 17B is a block diagram of a CORDIC processing element 1710 that implements the Type-2 transform shown in FIG. 10B. In the processing element 1710, the input $b_1$ is provided to an input of a register 1701, and the input $b_2$ is provided to an input of a register 1701. An output of the register 1701 is provided to a first data input, $x_k$, of the rotation block 1703 and to the output $b_1'$. An output of the register 1702 is provided to a second input, $y_k$, of the rotation block 1703 and to the output $b_2'$. The input $\theta_k$ is provided to a rotation input of a CORDIC rotation block 1703. The rotation block 1703 provides the first data output, $x_k'$, and the second data output, $y_k3$.

Figure 18:
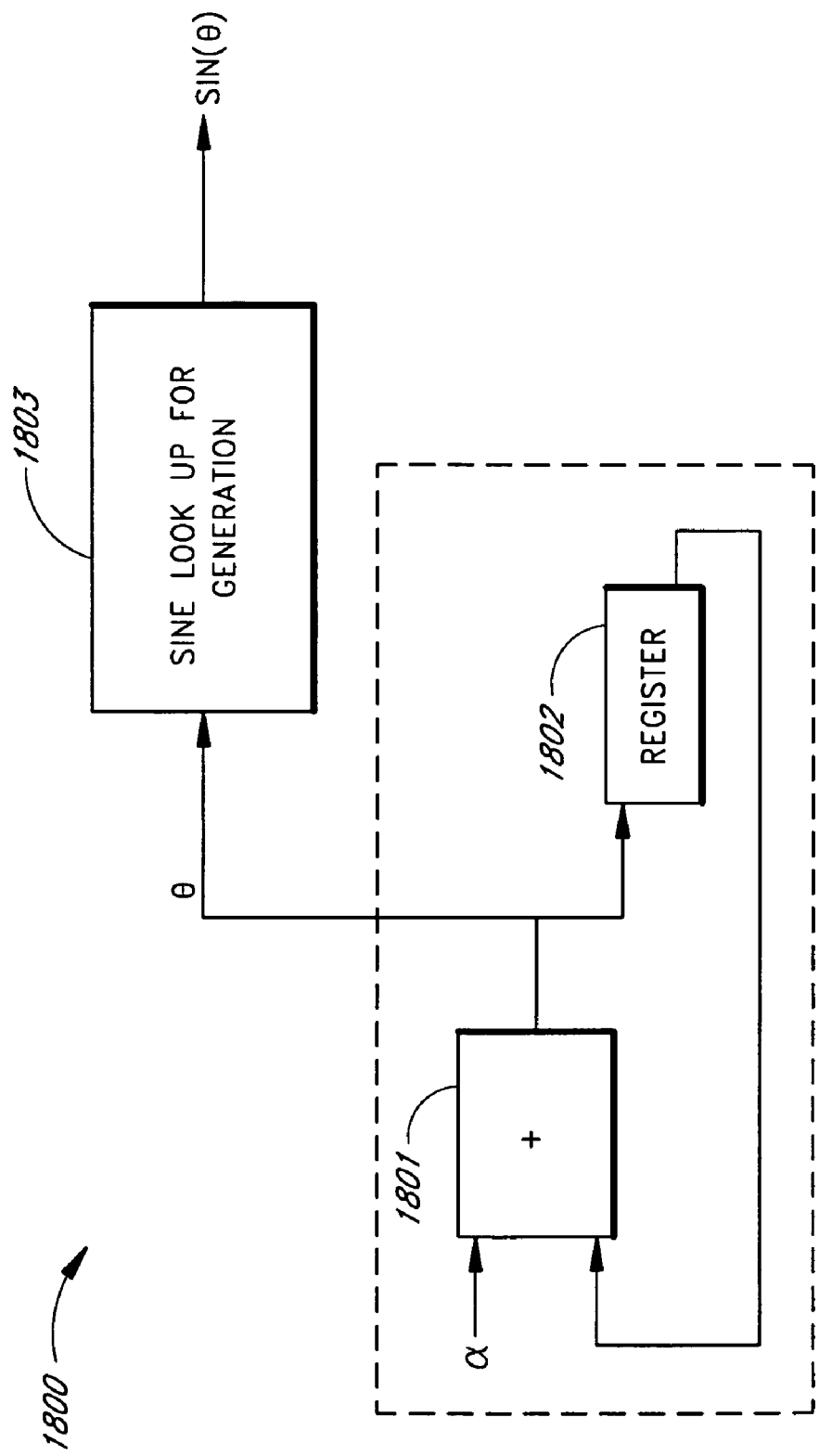
FIG. 18 is a block diagram of a basis function generator that uses a lookup table for sine and cosine generation.

FIG. 18 is a block diagram of a basis function generator 1800 that uses a lookup table for sine and/or cosine generation. In the generator 1800, a frequency/phase control value α is provided to a first input of an adder 1801. An output of the adder 1801 is a signal θ that is provided to an input of a register 1802 and to an input of a sine/cosine lookup table 1803. An output of the register 1802 is provided to a second input of the adder 1801. An output of the sine/cosine lookup table 1803 is the generated basis function $\sin(\theta)$ or $\cos(\theta)$. The frequency control parameter $\alpha$ is used to control the frequency and phase of $\sin(\theta)$ or $\cos(\theta)$. When $\alpha$ has a constant value, $\sin(\theta)$ or $\cos(\theta)$ has a fixed frequency and phase. Changing the value of $\alpha$ for one increment and then returning $\alpha$ to its original value effects a phase shift in the output of the generator 1800.

Figure 19:
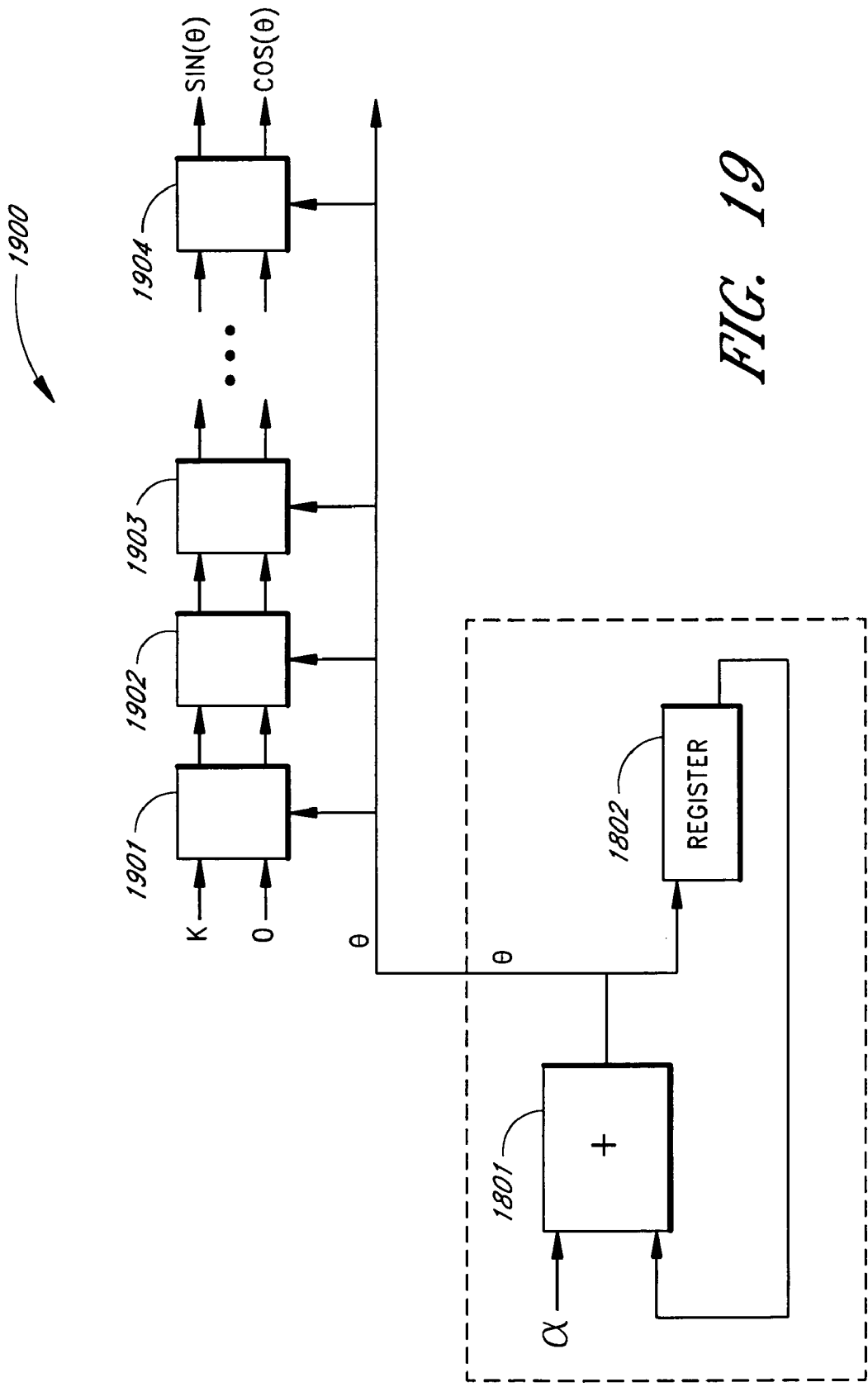
FIG. 19 is a block diagram of a basis function generator that uses a CORDIC for sine and cosine generation.

FIG. 19 is a block diagram of a basis function generator 1900 that uses a CORDIC algorithm for sine and cosine generation. In the generator 1900, a frequency/phase control value $\alpha$ is provided to a first input of an adder 1801. An output of the adder 1801 is a signal $\theta$ that is provided to an input of a register 1802 and to $\theta$ inputs of CORDIC rotation blocks 1901–1904. An output of the register 1802 is provided to a second input of the adder 1801. The CORDIC rotation block 1902 is provided with inputs K and 0 respectively. Data outputs from the CORDIC rotation block 1901 are provided to respective data inputs of the CORDIC ration block 1902. Data outputs from the CORDIC rotation block 1901 are provided to respective data inputs of the CORDIC ration block 1903. Similarly, data outputs from the preceding CORDIC rotation block are provided to each successive CORDIC rotation block. Data outputs from the CORDIC rotation block 1904 are $\sin(\theta)$ and $\cos(\theta)$ respectively.

As described above, FIG. 10B shows the Type-2 sliding-window transform. This transform can be efficiently implemented in an FPGA or an ASIC using fixed-point arithmetic.

Figure 20:
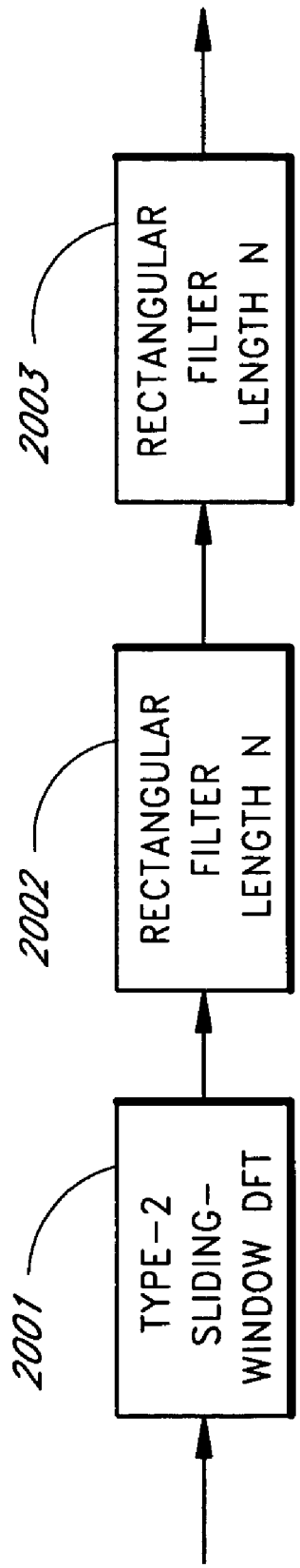
FIG. 20 is a block diagram of a Type-2 sliding-window DFT with additional filtering.

Some characteristics of the DFT can be improved by additional rectangular-type filters applied to the output of a Type-2 transform 2001 as shown in FIG. 20. If one views the DFT as having sinc-type frequency response characteristic, additional filtering done as shown in FIG. 20 along with the sliding window can improve the filtering characteristics of the DFT (i.e. to having a $\text{sinc}^2$ or $\text{sinc}^3$ frequency response characteristics). Filtering can be integrated into the sliding window transform (rather than applying the filter to the output of the transform). This integration can be done with little addition to hardware to the overall system. In FIG. 20, the output of the Type-2 sliding window transform 2001 is provided to an input of a first filter 2002. An output of the first filter 2002 is provided to an input of a second filter 2003. An output of the second filter 2003 is provided as an output of the filtered sliding window transform. The filters 2002 and 2003 can be of any length, but lengths equal to the DFT length or half the DFT length can be optimized. In the form shown in FIG. 20, each additional filter requires additional memory and arithmetic. Since the output of the transform 2001 is complex, the additional filters 2002 and 2003 operate on complex data.

Figure 21:
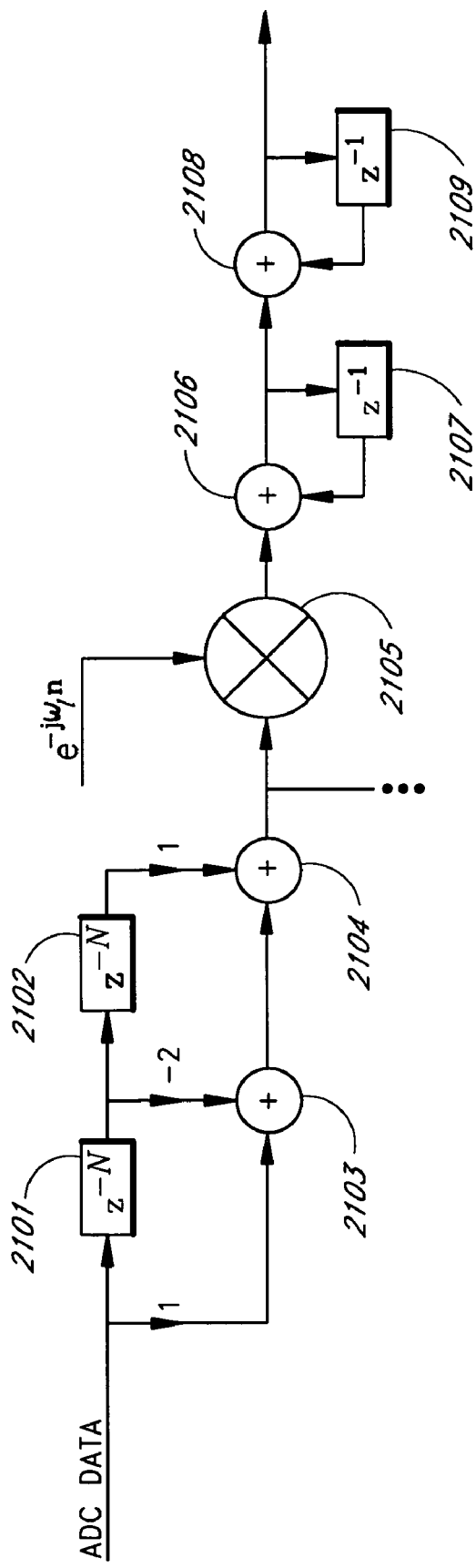
FIG. 21 is a block diagram of a Type-2 sliding-window DFT with one stage of additional filtering integrated into the DFT.
Figure 22:
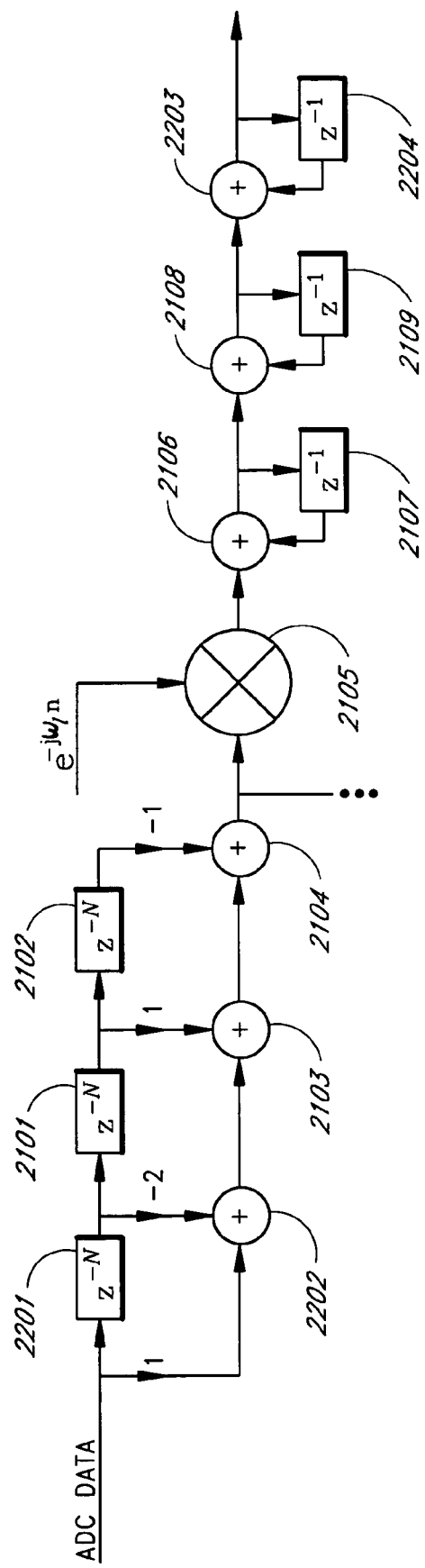
FIG. 22 is a block diagram of a Type-2 sliding-window DFT with two stages of additional filtering integrated into the DFT.

FIGS. 21 and 22 are block diagrams showing integration of the filters 2002 and 2003 into the sliding-window DFT in order to reduce hardware requirements. FIG. 21 shows a Type-2 sliding-window DFT with one additional rectangular filter. FIG. 22 shows a Type-2 sliding-window DFT with two additional rectangular filters.

In FIG. 21, data from the analog-to-digital converter 323 is provided to an input of a $z^{-N}$ time delay 2101 and to a first input of an adder 2103. An output of the time delay 2101 is provided to an input of a $z^{-N}$ time delay 2102 and to a second input of the adder 2103 (with a weight of $-2$). An output of the adder 2103 is provided to a first input of an adder 2104. An output of the time delay 2102 is provided to a second input of the adder 2104. An output of the adder 2104 is provided to a first input of a multiplier 2105. A complex coefficient $e^{-j\omega_i n}$ is provided to a second input of the multiplier 2105. An output of the multiplier 2105 is provided to a first input of an adder 2106. An output of the adder 2106 is provided to an input of a $z^{-1}$ time delay 2107 and to a first input of an adder 2108. An output of the time delay 2107 is provided to a second input of the adder 2106. An output of the adder 2108 is provided to an input of a $z^{-1}$ time delay 2109 and as an output of the filtered Type-2 sliding window DFT. An output of the time delay 2109 is provided to a second input of the adder 2108

In FIG. 22, data from the analog-to-digital converter 323 is provided to an input of a $z^{-N}$ time delay 2201 and to a first input of an adder 2202. An output from the time delay 2201 is provided to provided to an input of the $z^{-N}$ time delay 2101 and to the second input of the adder 2102 (with a weight of $-2$). An output of the time delay 2101 is provided to the input of the $z^{-N}$ time delay 2102 and to the second input of the adder 2103 (with a weight of 1). The output of the adder 2103 is provided to the first input of an adder 2104. The output of the time delay 2102 is provided to the second input of the adder 2104 (with a weight of $-1$). An output of the adder 2104 is provided to a first input of a multiplier 2105. A complex coefficient $e^{j\omega_i n}$ is provided to a second input of the multiplier 2105. An output of the multiplier 2105 is provided to a first input of an adder 2106. An output of the adder 2106 is provided to an input of a $z^{-1}$ time delay 2107 and to a first input of an adder 2108. An output of the time delay 2107 is provided to a second input of the adder 2106. An output of the adder 2108 is provided to an input of a $z^{-1}$ time delay 2109 and to a first input of an adder 2203. An output of the adder 2203 is provided to an input of a $z^{-1}$ time delay 2204 and as an output of the filtered Type-2 sliding window DFT. An output of the time delay 2204 is provided to a second input of the adder 2203

Advantageously, the delay elements 2101, 2102, and 2201 operate on real numbers. The delay elements 2101, 2102, and 2201 can be shared between multiple bins or sub-carriers like the delay 1010 shown in FIGS. 10A and 10B. For each additional rectangular type filter of length N, the symbol length must be increased by N. In some systems this is acceptable. Even in systems where increasing the symbol length is unacceptable, the structure shown in FIGS. 21 and 22 can be used if it is desired that filtering be done on certain portions of the received signal, with no filtering (or other filtering) being done on the rest. An example could be for synchronization in the received signal. After the synchronization, the standard Type-2 sliding-window DFT (without additional rectangular filters) can be used for the remainder of the packet. This is useful when synchronization employs longer symbols than the data sections of the packet. Since the structures with integrated filters are similar, it is possible for a system to utilize the same structural components when this switch is made.

Although this invention has been described in terms of certain embodiments, other embodiments apparent to those of ordinary skill in the art also are within the scope of this invention. Various changes and modifications may be made without departing from the spirit and scope of the invention. For example, one skilled in the art will recognize that the DFT process can be based on other inner products to produce orthogonal or quasi-orthogonal basis functions. The sliding-window basis functions can also be based on wavelets. Accordingly, the scope of the invention is defined by the claims that follow.

What is claimed is:

1. A receiver comprising a time-to-frequency converter, said time-to-frequency converter configured to receive a stream of data samples and calculate M streams of output values for M communication channels, said converter configured to calculate each of said output values using N input values, wherein the value of N is selected on a channel-by-channel basis such that a first channel uses a value for N that is different from a value of N used by a second channel, said receiver further comprising a first sliding window transform configured to transform said received stream of data samples to said first channel using a first transform length and a second sliding window transform configured to transform said received stream of data samples to said second channel using a second transform length.

2. The receiver of claim 1, wherein M does not equal N.

3. The receiver of claim 1, wherein a new output value is computed for each channel each time said converter receives a new input value.

4. The receiver of claim 1, wherein said receiver is configured to receive communication signals from a power line network.

5. The receiver of claim 1, wherein said receiver is configured to receive communication signals from a wireless network.

6. The receiver of claim 1, wherein N defines a basis function length.

7. The receiver of claim 1, further comprising an equalizer configured to equalize a data value for said first channel, said equalizer configured to determine equalization parameters by examining a packet header.

8. A communication receiver configured to receive data transmitted on a plurality of carriers, comprising:
a sub-band filter for separating a received analog signal into a plurality of separate sub-band signals corresponding to a plurality of sub-bands, where at least one of said sub-bands comprises a plurality of sub-channels, said plurality of sub-channels comprising a first sub-channel and a second sub-channel;
an analog to digital converter configured to convert a first sub-band signal into a first sub-band digital data stream;
a first sliding-window transform configured to transform said first sub-band digital data stream into a first channel data stream using N time-domain input values to generate M frequency domain output values; and a second sliding-window transform configured to transform said first sub-band digital data stream into a second channel data stream using N input values to generate M frequency domain output values, where the value N used for said second channel is different form the value of N used for said first channel.

9. The communication receiver of claim 8, wherein said receiver is configured to receive communication signals from a power line network.

10. The communication receiver of claim 8, wherein said receiver is configured to receive communication signals from a radio transmission network.

11. The communication receiver of claim 8, wherein said receiver is configured to receive communication signals from a wireless network.

12. The communication receiver of claim 8, wherein said receiver is configured to receive communication signals from a wired network.

13. The communication receiver of claim 8, wherein said sub-band filter comprises a bandpass filter.

14. The communication receiver of claim 8, wherein said sub-band filter comprises a surface acoustic wave filter.

15. The communication receiver of claim 8, wherein an amplitude of at least one of said sub-band signals is adjusted by an automatic gain control.

16. The communication receiver of claim 8, wherein said first sliding-window transform converts said sub-band digital data stream into at least one frequency-domain digital data stream.

17. The communication receiver of claim 8, wherein said first sliding window transform uses N time-domain samples from said sub-band digital data stream to generate M frequency domain output values corresponding to M sub-channels.

18. The communication receiver of claim 17, wherein M is greater than N.

19. The communication receiver of claim 17, wherein M is less than N.

20. The communication receiver of claim 17, wherein N is calculated on a sub-band by sub-band basis depending on a carrier-frequency spacing for each sub-band.

21. The communication receiver of claim 8, wherein said first sliding window transform comprises CORDIC algorithm.

22. The communication receiver of claim 8, further comprising a demodulator for demodulating said first channel data stream.

23. The communication receiver of claim 8, further comprising a differential demodulator for demodulating said first channel data stream.

24. The communication receiver of claim 8, further comprising a synchronizer configured to extract synchronization information from said first channel data stream and provide said synchronization information to a data aligner, said data aligner configured to bit-align said first channel data stream to produce an aligned data stream.

25. The communication receiver of claim 24, further comprising at least one equalizer, said at least one equalizer configured to equalize said aligned data stream.

26. The communication receiver of claim 25, further comprising a channel manager, said channel manager configured to receive equalization information from at least said at least one equalizer, said channel manager configured to provide amplitude equalization information to said automatic gain control.

27. The communication receiver of claim 25, further comprising a channel manager, said channel manager configured to receive equalization information from at least said at least one equalizer, said channel manager configured to provide phase equalization information to a clock, said clock configured to provide a clock signal to said analog to digital converter.

28. The communication receiver of claim 24, wherein said encoded data on said first sub-band is modulated using a first modulation scheme and wherein data on said second sub-band is modulated using a second modulation scheme, where said first modulation scheme is different from said second modulation scheme.

29. The communication receiver of claim 24, further comprising a spreading decoder.

* * * * *